United States Patent [19]
Ohtomo et al.

[11] Patent Number: 5,727,140
[45] Date of Patent: Mar. 10, 1998

[54] CHARACTER GENERATING METHOD AND APPARATUS

[75] Inventors: Mutsumi Ohtomo, Sapporo; Tomoko Motokado; Shinichiro Motokado, both of Kawasaki, all of Japan

[73] Assignee: Fujitsu Limited, Kanagawa, Japan

[21] Appl. No.: 9,896

[22] Filed: Jan. 27, 1993

[30] Foreign Application Priority Data

Jan. 27, 1992 [JP] Japan .................................. 4-012006
Feb. 20, 1992 [JP] Japan .................................. 4-033400

[51] Int. Cl.⁶ .................................................. G06K 9/44
[52] U.S. Cl. ................................... 395/167; 395/172
[58] Field of Search ........................... 395/150–151, 395/140–144, 167, 172; 345/26, 16, 116, 124, 141–144; 400/76

[56] References Cited

U.S. PATENT DOCUMENTS

| | | | |
|---|---|---|---|
| 4,173,753 | 11/1979 | Chou | 340/146.3 |
| 4,286,329 | 8/1981 | Goertzel et al. | 364/900 |
| 4,675,830 | 6/1987 | Hawkins | 364/518 |
| 4,897,638 | 1/1990 | Kokunishi et al. | 340/751 |
| 4,931,953 | 6/1990 | Uehera et al. | 364/518 |
| 5,093,870 | 3/1992 | Watanabe | 382/47 |
| 5,155,805 | 10/1992 | Kaasila | 395/151 |
| 5,197,108 | 3/1993 | Watanabe | 382/47 |
| 5,257,016 | 10/1993 | Fujii et al. | 345/143 |
| 5,305,433 | 4/1994 | Ohno | 395/150 |
| 5,313,573 | 5/1994 | Takahama | 395/150 |
| 5,398,311 | 3/1995 | Seto | 395/151 |
| 5,404,436 | 4/1995 | Hamilton | 395/150 |
| 5,459,828 | 10/1995 | Zack et al. | 395/151 |

FOREIGN PATENT DOCUMENTS

| | | |
|---|---|---|
| 5711382 | 1/1981 | Japan . |
| 60-11888 | 1/1985 | Japan . |
| 60-202476 | 10/1985 | Japan . |
| 64-35483 | 2/1989 | Japan . |
| 64-75260 | 3/1989 | Japan . |
| 3184088 | 8/1991 | Japan . |

OTHER PUBLICATIONS

Foley, James D., et al, "Computer Graphics: Principles and Practices", *Addison–Wesley Publishing Co., 2nd ed. pp. 166–175, 1990*, (hereinafter Foley).

*Primary Examiner*—Joseph H. Feild
*Assistant Examiner*—Rudolph Buchel
*Attorney, Agent, or Firm*—Helfgott & Karas, P.C.

[57] ABSTRACT

In a character generating method and apparatus for dividing each character pattern into a plurality of partial patterns, storing the partial patterns, selecting the proper partial patterns from the stored ones, and arranging the selected partial patterns at respective start points, a memory stores common start point data representing an absolute start point, common to corresponding partial patterns of a plurality of characters having the same arrangement of partial patterns constituting a character pattern, as coordinate values from a set origin, relative position data representing positions of the partial patterns of the plurality of characters from the common start points as relative positions, and shape data of the partial patterns, representing shapes of the patterns. The common start point data, the relative position data and the shape data are read out from the memory. The coordinate values of the absolute start points of the individual partial patterns are computed from the common start point data and the relative position data. The partial patterns having the shape matching the shape data are arranged at the coordinates of the absolute start points to generate a character pattern corresponding to the character code.

18 Claims, 34 Drawing Sheets

CONTOUR INFORMATION PORTION

| HEADER | NUMBER OF DATA POINTS | | |
|---|---|---|---|
| | 1 | Xa | Ya |
| | 1 | Xb | Yb |
| | 1 | Xc | Yc |
| | 1 | Xd | Yd |
| | 0 | Xe | Ye |
| | 0 | Xf | Yf |
| HEADER | NUMBER OF DATA POINTS | | |

STROKE 1

FIG. 19(C)
| HEADER | NUMBER OF DATA POINTS | | |
|---|---|---|---|
| 1 | Xa | Ya | a |
| 1 | Xb | Yb | b |
| 0 | Xc | Yc | c |
| 0 | Xd | Yd | d |
| HEADER | NUMBER OF DATA POINTS | | |
STROKE 1
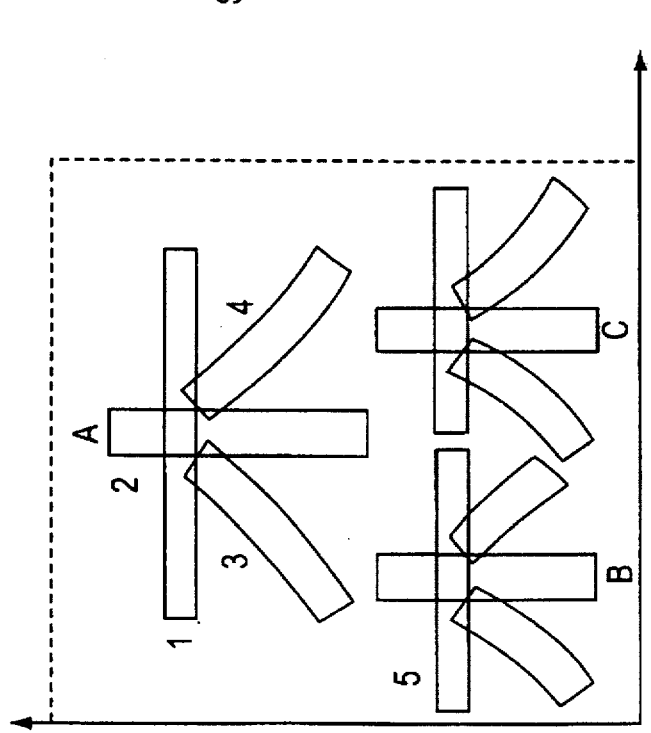
FIG. 19(A)
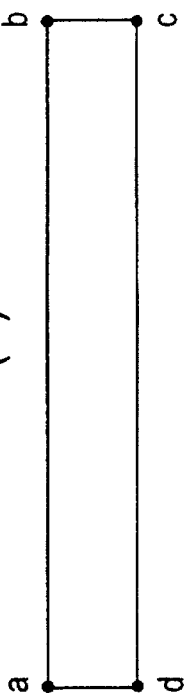
FIG. 19(B)

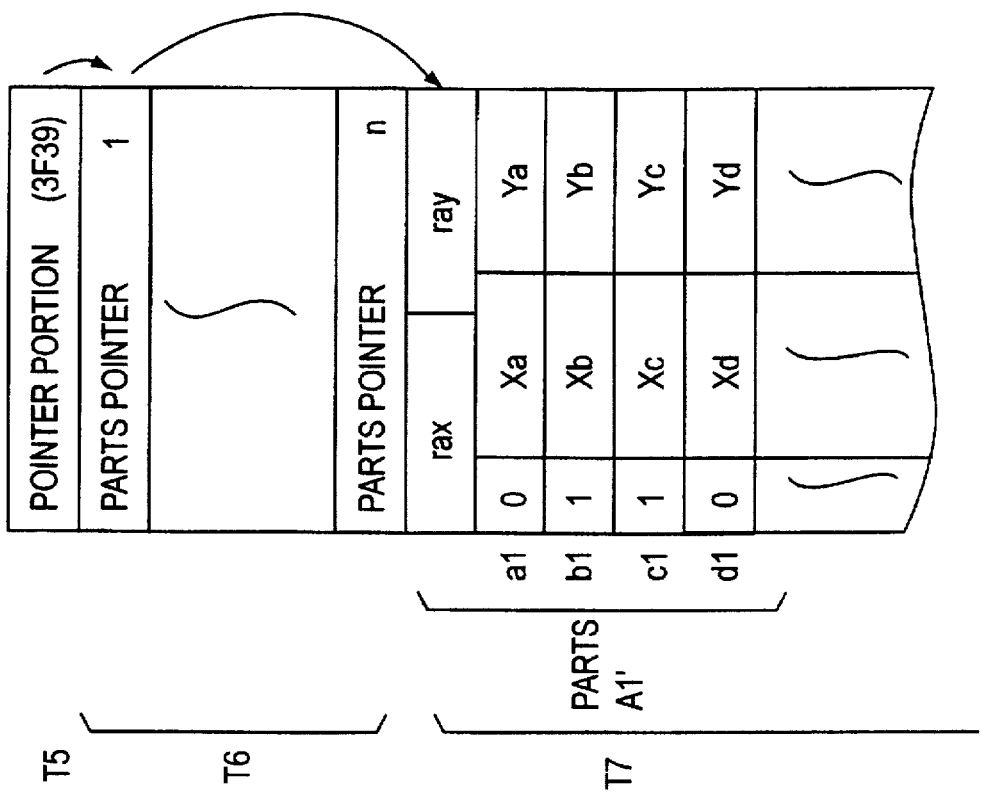
FIG. 24(C)
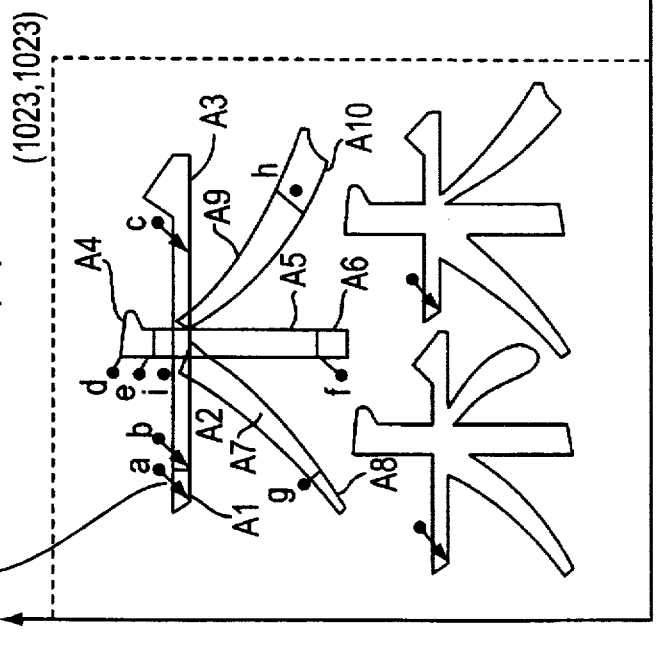
FIG. 24(A)
FIG. 24(B)

| TYPE FACE | CONTOUR IMAGE | START POINT | | CONTOUR DATA |
|---|---|---|---|---|
| MINCHO | 1 | Xa | Ya |  |
| | 2 | Xb | Yb |  |
| | 3 | Xc | Yc |  |
| SQUARE GOCHIC | 1 | | | |
| | 2 | | | |
| | 3 | | | |
| ROUND GOCHIC | | | | |

SCALING DOWN TO 0.7

CHARACTER GENERATING METHOD AND APPARATUS

BACKGROUND OF THE INVENTION

1. Field of the Invention

The present invention relates to a character generating method and apparatus for generating character patterns. More specifically, this invention relates to a character generating method and apparatus, which divide each of character patterns into a plurality of partial patterns, obtain the partial patterns of the desired character and arrange the obtained partial patterns to predetermined start points to generate the associated character pattern.

Apparatuses for displaying or printing characters have character patterns stored therein, generate character patterns corresponding to character codes and display or print the patterns. The character patterns are described with bitmap format for storage. For Kanji characters or the like which include many characters, to store the individual character patterns with bitmap format increases the memory capacity to store it. To reduce the memory capacity, there has been proposed a method which breaks down each character pattern into a plurality of partial patterns (including elements, strokes and parts), stores said partial patterns into the memory, and shares the partial patterns to generate the desired character pattern.

As this method can share the stored partial patterns for a plurality of characters, it can reduce the memory capacity considerably.

2. Description of the Related Art

For instance, a Kanji character "Mori" (see FIG. 30A) is divided into three elements "Ki" 1, 2 and 3, each having a continuous shape, as shown in FIG. 30A. The shapes of those three elements are stored. The absolute coordinate origin of the body of the character is taken at the lower left corner, and the position of each element is represented by an offset (start vector a, b or c) to the start point of the element from the origin and is stored in association with that element. The start vector is indicated by X and Y coordinates from the origin set as (0, 0). For a body size of 1023×1023, the X and Y coordinates each require 2-byte data.

As shown in FIG. 30B, the shape of each element is expressed by vectors each representing the points relatively to the previous points in such a way that the contour of the element is expressed by a sequence of those vectors, saving the necessary memory capacity.

The character data of Kanji character "Mori" (see FIG. 30A) is therefore comprised of start vector data (X, Y) of the individual elements and the contour data of the individual elements as shown in FIG. 31.

In this system, the same data format is employed for Kanji character "Mori" in Mincho and Kanji character "Mori" in Gothic, and the character data is therefore comprised of start vectors of the individual elements and the contour data of the individual elements, as shown in FIG. 31.

Recently a high resolution (e.g., 400 dpi) is demanded for printers or the like which utilize character patterns. To meet the demand even with the employment of multi-fonts to generate characters of multiple sizes, the body size of each character should be increased in order to present that character clearly; for instance, the setting coordinate system of a character is 256×256 or above. There are also demands for multi-font as well as to increase the number of characters.

Heretofore, there are many Kanji characters which have the same arrangement for the partial patterns even with different patterns. Kanji characters with the same radical (the left-hand radical including "Gonben" and "Sanzui," the right-hand radical, etc.) belong to that type. Even in this case, a 2-byte start vector should be allocated for each of the partial patterns that constitute each character, preventing efficient data compression.

Similarly, for the same Kanji character with different typefaces, the shapes of corresponding partial patterns merely differ while the arrangement of the partial patterns is the same. This is the case for Kanji characters having a Mincho typeface, a Gothic typeface, and the like. Likewise, a 2-byte start vector should be allocated for each of the partial patterns that constitute each character in this case, so that efficient data compression is not possible.

Generation of such character patterns often involves scaling of characters.

As shown in FIG. 32A, if two lines 11 and 12 in an original character pattern each having a width of four dots (pixels) are scaled down to 0.7, the line 11 extending from a contour coordinate of "18" to "22" in the Y direction will have contour coordinates of "12.6" and "15.4" and, when rounded, will be quantized to have a 2-dot width from a contour coordinate of "13" to "15," while the line 12 extending from a contour coordinate of "10" to "14" in the Y direction will have contour coordinates of "7.0" and "9.8" and, when rounded, will be quantized to have a 3-dot width from a contour coordinate of "7" to "10."

When a character is produced after the contour data is scaled down or up in this manner, because the coordinate system a computer can have is a quantized coordinate system (having only integer values), there is an error originated so-called rounding, thus deteriorating the quality of the generated character. For example, the horizontal strokes of a Mincho character "Hi" (see FIG. 32B) after such processing may have uneven widths as illustrated.

This also happens for the other characters; for example, if a Mincho character "Mori" (see FIG. 33) is scaled down, the shape of the end part of horizontal stroke of each element ("Ki") A, B or C is changed from the original shape enclosed by the thick solid line to the shaded shape, and the line width may differ as shown in FIG. 33.

As a scheme to preserve the shape of such a character even after scaling, a method has been proposed to affix hint information to contour data and the contour of a character is compensated with the hint information at the time of rounding, as shown in FIG. 34. In this specification, "hint" is defined to mean control for quality improvement.

FIG. 34A exemplifies compensation for the width of a horizontal stroke of a character. The left-hand part of the diagram is before the compensation, the right-hand part is after the compensation, the measure is the coordinate system of an output device, the black solid line represents a font data that has been scaled down to the output resolution, and points on a rectangular block are what should be compensated.

In this case, as a target stroke is a horizontal stroke of a character, the two points at the bottom of the horizontal stroke with arrows, taken as reference points, are shifted to the nearest integer values in the coordinate system, while the other two points at the top of the horizontal stroke, taken as relative points, are shifted relative to the reference points, thereby securing a line width of 2 pixels as shown in the left-had part of the diagram.

When a stroke to be compensated is a vertical stroke, the shifting is done horizontally.

FIG. 34B exemplifies compensation of a curved stroke ("hane" or a tapered stroke, "harai" or a diagonal curved stroke, etc.), and the basic processing is the same as shown in FIG. 34A. When a curved stroke is nearly upright, it is compensated in the horizontal (X) direction as done for a vertical stroke, and when the curved stroke is nearly horizontal, it is compensated in the vertical (Y) direction as done for a horizontal stroke.

The quality of a character is basically determined by the role of a target stroke to the structure of the character (such as a horizontal stroke, vertical stroke, or diagonal stroke) except for compensation of a geometric shape.

Conventionally, the character structure is determined using a scheme to recognize the pattern of a character from the contour data of the character.

This prior art method however cannot perform accurate quality compensation or hinting. For example, since a stroke as shown on the left-hand side in FIG. 34C has a vertically long contour though it is actually a part of a horizontal stroke of one character, the stroke is erroneously recognized as a vertical stroke; likewise, since a stroke as shown or the right-hand side in FIG. 34C has a horizontally long contour though it is actually a part of a vertical stroke of one character, this stroke is erroneously recognized as a horizontal stroke.

In addition, as this conventional method involves complicated recognition processing for characters having complex shapes, it cannot be adapted for an inexpensive apparatus.

SUMMARY OF THE INVENTION

It is therefore a primary object of the present invention to provide a character generating method and apparatus which are designed to overcome the aforementioned problems.

It is another object of the present invention to provide a character generating method and apparatus which compress data for display of start points of partial patterns constituting each character to generate the character.

It is a still another object of the present invention to provide a character generating method and apparatus which compress data for display of start points of partial patterns constituting each character even when the partial patterns are broken down into finer portions, and generate the character.

It is a further object of the present invention to provide a character generating method and apparatus which can improve the quality of a generated character pattern even when the pattern is scaled down or up.

It is a still further object of the present invention to provide a character generating method and apparatus which can accurately improve the quality of a generated character pattern even when the pattern is scaled down or up.

According to the first aspect of the present invention, there is provided a character generating method for dividing each character pattern into a plurality of partial patterns, storing the partial patterns, selecting individual partial patterns constituting a character requested by a character code from the stored partial patterns, and arranging the selected partial patterns at respective start points in a desired character coordinate system to generate a character pattern having a dot structure corresponding to the character code, which method comprises the steps of reading common start point data of individual partial patterns of a character corresponding to a character code, and the relative position data and shape data of the individual partial patterns of the character from storage means in which common start point data representing an absolute start point, common to corresponding partial patterns of a plurality of characters having the same arrangement of partial patterns constituting a character pattern, as coordinates from a set origin, relative position data representing positions of the partial patterns of the plurality of characters from the common start points as relative positions, and shape data of the partial patterns are stored; computing coordinates of the absolute start points of the individual partial patterns of the requested character from the common start point data and the relative position data of the individual partial patterns; and arranging those partial patterns which match the shape data with positions in the desired character coordinate system indicated by the coordinates of the absolute start points as start points to generate a character pattern corresponding to the character code.

According to the second aspect of the present invention, there is provided a character generating apparatus for dividing each character pattern into a plurality of partial patterns, storing the partial patterns, selecting individual partial patterns constituting a character requested by a character code from the stored partial patterns, and arranging the selected partial patterns at respective start points in a desired character coordinate system to generate a character pattern having a dot structure corresponding to the character code, which apparatus comprises storage means having a common file for storing common start point data representing an absolute start point, common to corresponding partial patterns of a plurality of characters having the same arrangement of partial patterns constituting a character pattern, as coordinates from a set origin, an individual file for storing relative position data representing positions of the partial patterns of the plurality of characters from the common start points as relative positions, and shape data of the partial patterns are stored; and a character generating means for reading the common start point data of individual partial patterns of a character corresponding to a character code, and the relative position data and shape data of the individual partial patterns of the character from the storage means, computing coordinates of the absolute start points of the individual partial patterns of the requested character from the common start point data and the relative position data of the individual partial patterns, and arranging those partial patterns which match the shape data with positions in the desired character coordinate system indicated by the coordinates of the absolute start points as start points to generate a character pattern corresponding to the character code.

According to this invention, start vectors are not determined for each character, but for a plurality of characters having the same arrangement of partial patterns though different from one another, common start points a, b and c of individual partial patterns are set as shown in FIG. 1A and relative positions (offset values) with those common start points as origins are stored as shown in FIG. 1B.

In this manner, although the common start point requires 2 bytes, the relative position needs just 1 byte. If the number of the aforementioned multiple characters is "3" and the number of partial patterns of each character is "3," start vectors conventionally require 12 bytes per character, a total of 36 bytes for the three characters, whereas the present invention requires 12 bytes for the common start point and 6 bytes for the offset values of the three characters, a total of 18 bytes, which is a half the conventionally needed memory capacity.

For Kanji characters including about 7,000 characters, the present invention can significantly reduce the amount of data, thus saving the memory capacity accordingly.

According to the third aspect of the present invention, there is provided a character generating method for dividing each character pattern into a plurality of partial patterns, storing the partial patterns, selecting individual partial patterns constituting a character requested by a character code from the stored partial patterns, and arranging the selected partial patterns at respective start points in a desired character coordinate system to generate a character pattern having a dot structure corresponding to the character code, which method comprises the steps of reading from storage means in which point data of strokes or parts of each character, structure information representing types of the strokes or parts and hint information of individual pieces of the point data for hinting the strokes or parts for control for quality improvement are stored as the partial patterns, the point data and structure information of strokes or parts corresponding to a character code and the hint information; multiplying the point data by a scaling factor in response to scaling up or down of a character; subjecting the computed point data to quantization for compensation based on the structure information of the strokes or parts and the hint information; and forming the strokes or parts according to the quantized point data to generate the scaled-up or scaled-down character pattern.

According to the fourth aspect of the present invention, there is provided a character generating apparatus for dividing each character pattern into a plurality of partial patterns, storing the partial patterns, selecting individual partial patterns constituting a character requested by a character code from the stored partial patterns, and arranging the selected partial patterns at respective start points in a desired character coordinate system to generate a character pattern having a dot structure corresponding to the character code, which apparatus comprises storage means in which point data of strokes or parts of each character, structure information representing types of the strokes or parts and hint information of individual pieces of the point data for hinting the strokes or parts for control for quality improvement are stored as the partial patterns; and a character generating section for reading the point data and structure information of strokes or parts corresponding to a character code and the hint information, multiplying the point data by a scaling factor in response to scaling up or down of a character, subjecting the computed point data to quantization for compensation based on the structure information of the strokes or parts and the hint information, and forming the strokes or parts according to the quantized point data to generate the scaled-up or scaled-down character pattern.

According to this invention, the structure information of the individual strokes or parts of each character are previously stored in a memory, point data is multiplied by a scaling factor in response to scaling up or down of a character, the computed point data is subjected to quantization for compensation based on the structure information of the strokes or parts and the hint information, and the individual strokes or parts are formed based on the quantized point data. This prevents a stroke from being erroneously recognized through pattern recognition, ensuring accurate hinting. Further, as the point data, structure information and hint information need only to be stored in a memory, this scheme can easily be accomplished.

Other features and advantages of the present invention will be readily apparent from the following description taken in conjunction with the accompanying drawings.

BRIEF DESCRIPTION OF THE DRAWINGS

FIGS. 19(A,B and C) is a diagram for explaining data of a Gothic character according to the fifth embodiment;

FIGS. 24(A,B and C) is a diagram for explaining data of a Mincho character according to the sixth embodiment;

DETAILED DESCRIPTION OF THE PREFERRED EMBODIMENTS

Figure 1A:
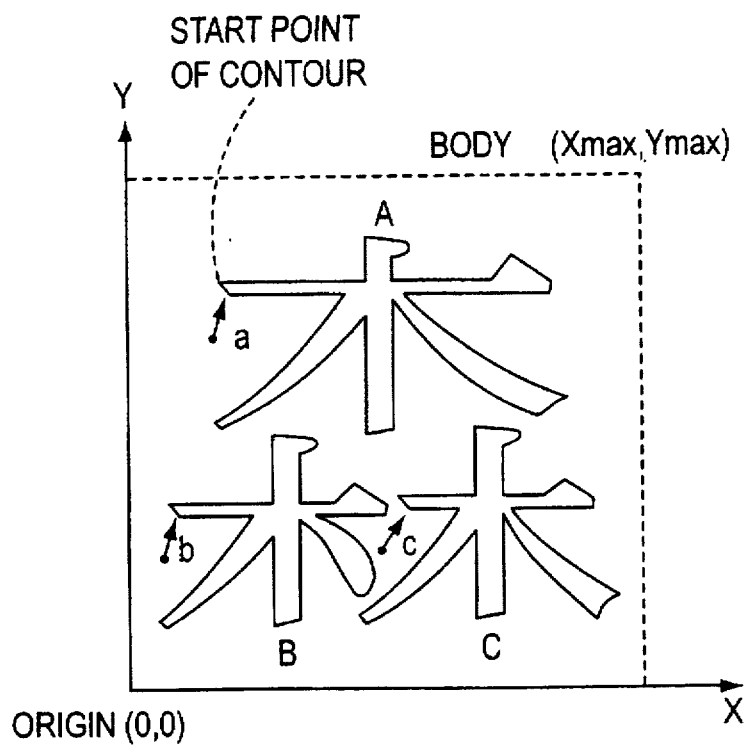
FIGS. 1(A and B) is a schematic exemplary diagram for reducing the amount of data of start vectors of a partial pattern according to the present invention.
Figure 1B:
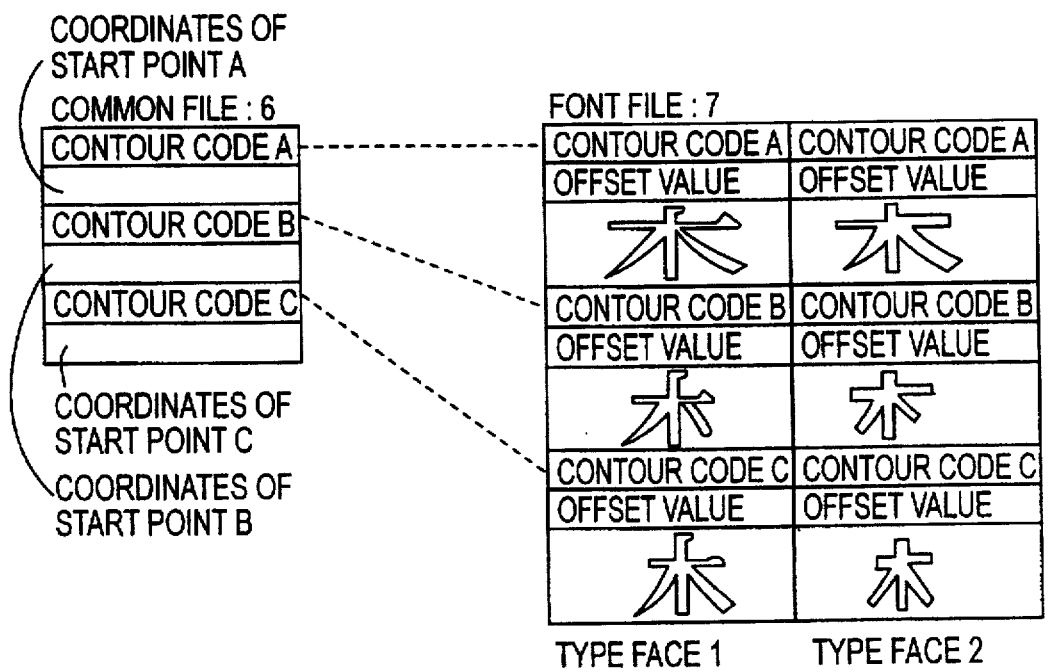
Figure 2:
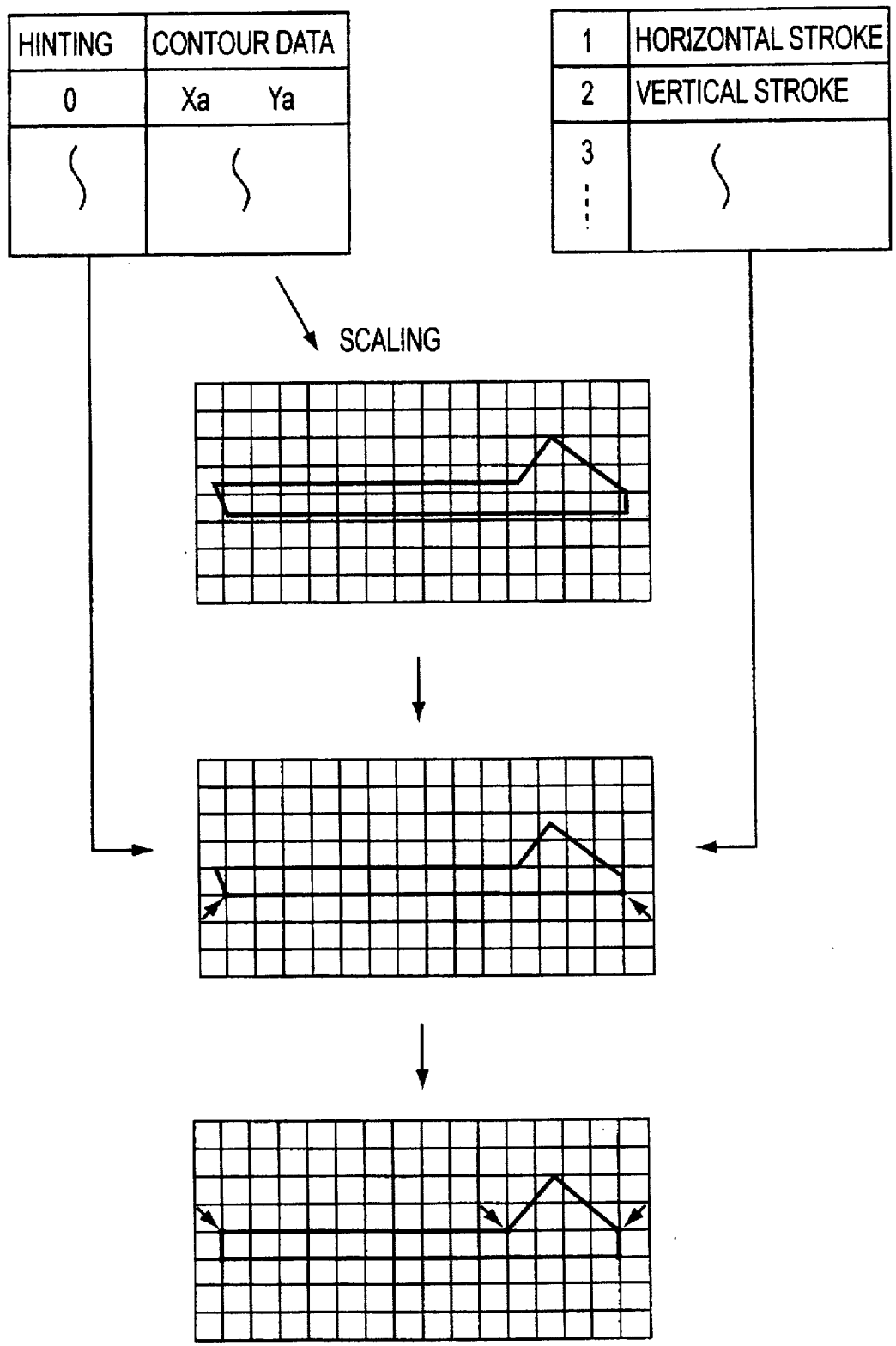
FIG. 2 is a schematic exemplary diagram for a hinting process in scaling up or down a partial pattern according to the present invention.
Figure 3:
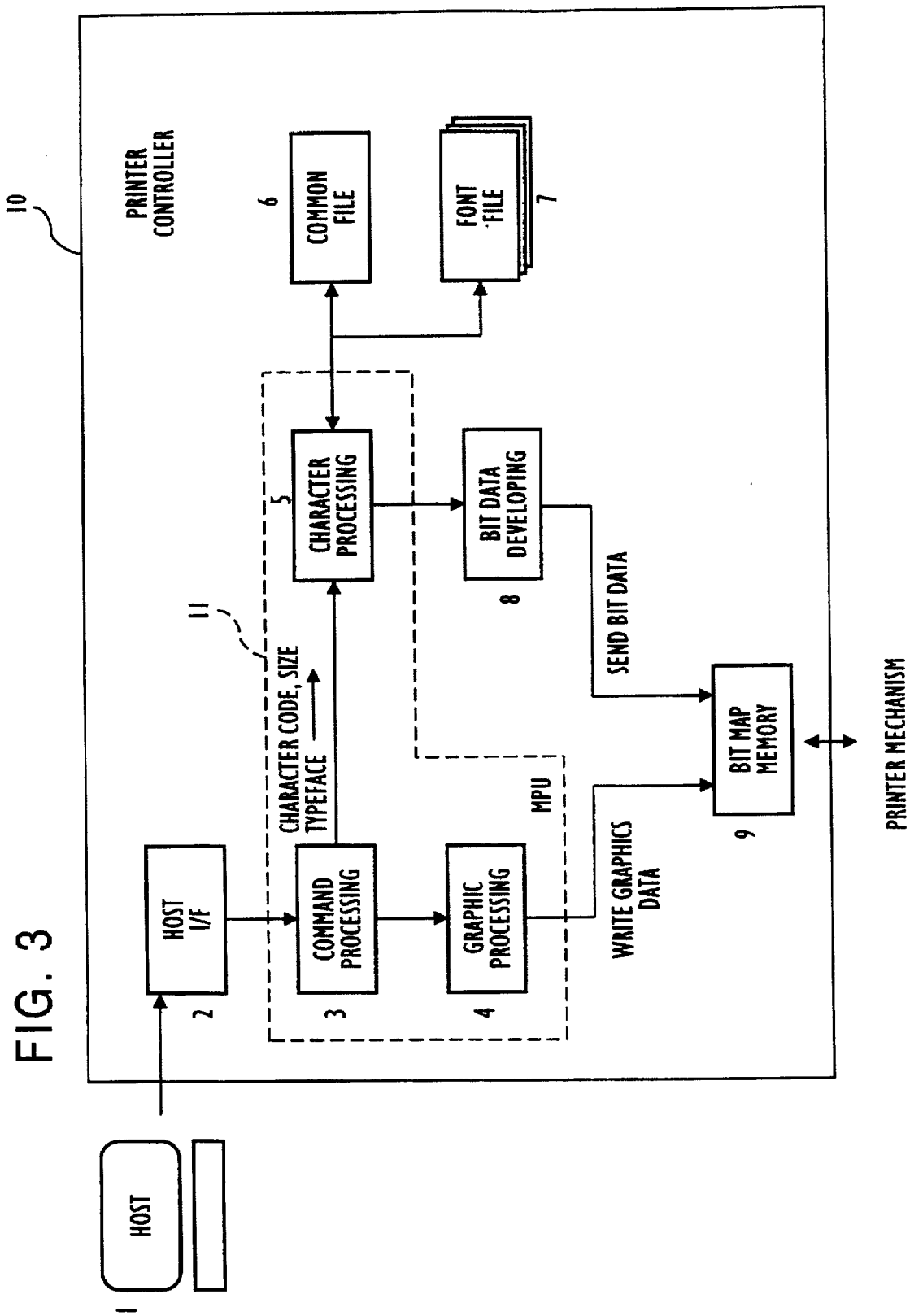
FIG. 3 is a block diagram of a controller of a printer embodying the present invention.

FIG. 3 presents a block diagram of the controller of a printer embodying the present invention. FIGS. 4 and 5 present diagrams for explaining a first embodiment of the present invention, showing character data with different typefaces which represent the same character.

In FIG. 3, a host machine 1, constituted of a personal computer, a wordprocessor or the like, sends print data to a printer controller 10. The printer controller 10, which is connected to the host machine 1 and a printer mechanism (not shown), prepares print data and sends it to the printer mechanism in accordance with an instruction from the host machine 1.

The printer controller 10 includes a host interface circuit 2 for controlling an interface with the host machine 1, a command processing block 3 for discriminating if the print data from the host machine 1 is graphics data or character data, a graphics processing block 4 for preparing bit data of a figure in accordance with the graphics data from the command processing block 3, and a character processing block 5. This character processing block 5 reads necessary common start points, hierarchy information and font data specific to a typeface from a common typeface information memory (hereinafter referred to as "common file") 6 and a font information memory (hereinafter referred to as "font file") 7 (both will be described later) in accordance with the character data (character code, character size and font name) from the command processing block 3, and prepares character of an outline format.

The common file 6 stores information common to typefaces of each character (common start point information, hierarchy information, etc.). The font file 7 stores font data specific to the individual typefaces. A bit data developing circuit 8, which is constituted of an outline font generator (MB89412, a product of Fujitsu Limited), develops a character of an outline format. A bit map memory 9 is a memory in or from which graphics bit data and character bit data are written or read out, and the read-out data is output to the printer mechanism (not shown) to be printed.

The command processing block 3, graphics processing block 4 and character processing block 5 are constituted of a single microprocessor (MPU) 11, and those blocks 3, 4 and 5 show the programs the microprocessor 11 runs as blocks.

Figure 4A:
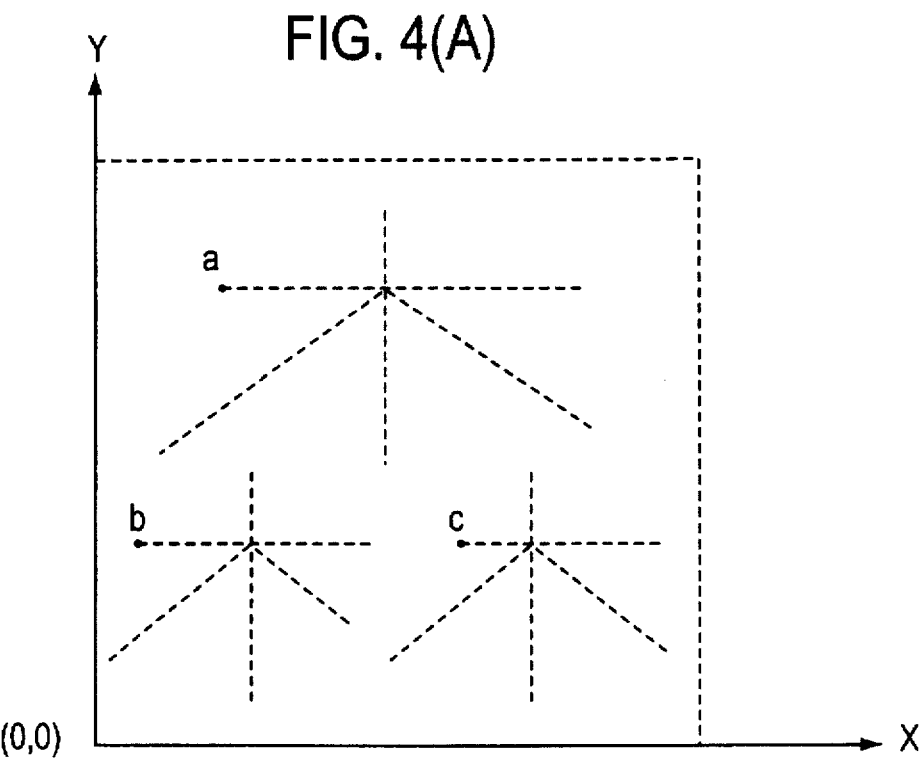
FIGS. 4(A and B) is an exemplary diagram of position data of common start points according to a first embodiment of the present invention.
Figure 4B:
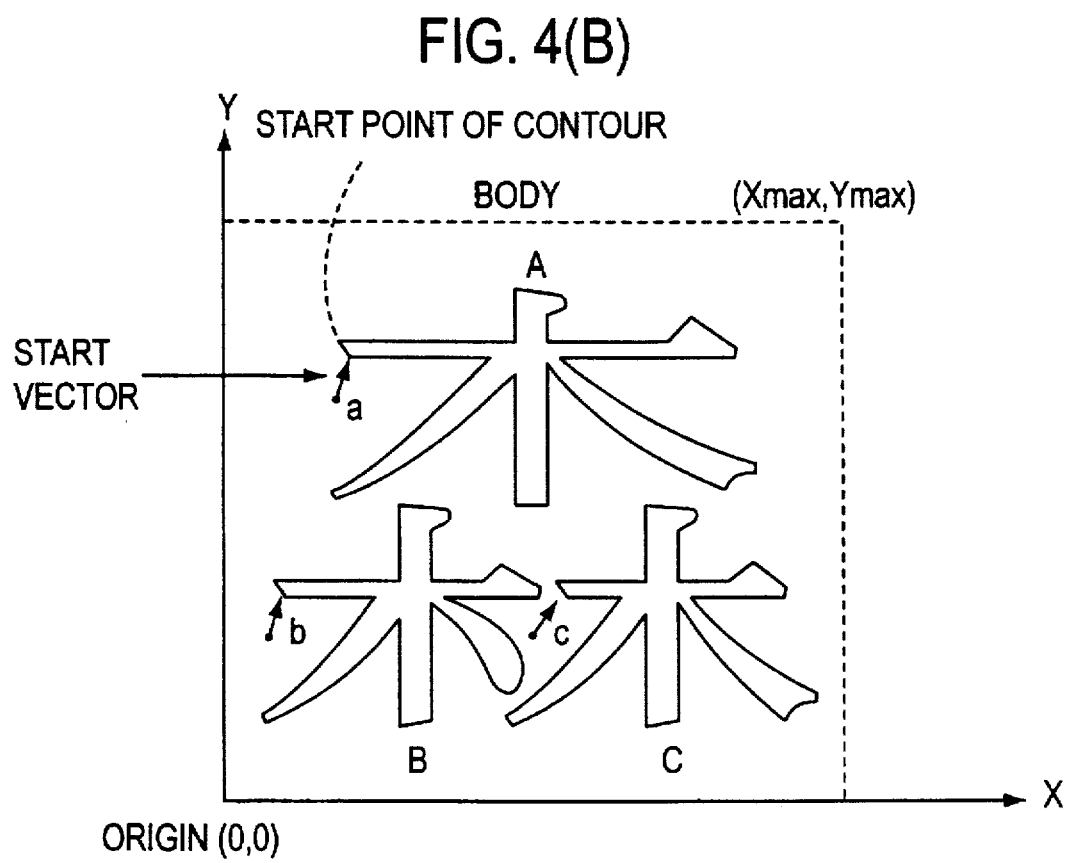
Figure 5A:
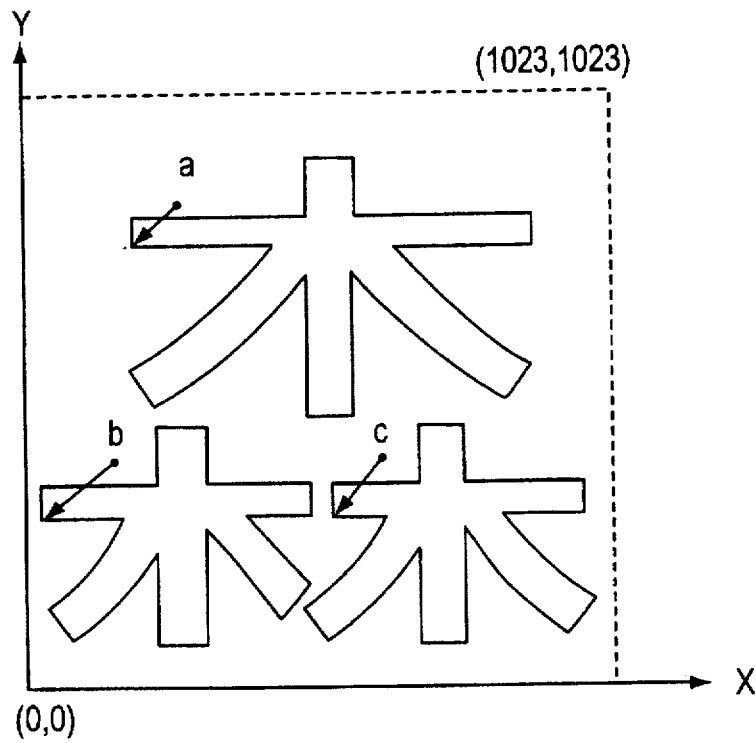
FIGS. 5(A and B) is an exemplary diagram of relative position data of each element according to the first embodiment.

In the common file 6 the individual start points a, b and c of elements or partial patterns of the frame of a character are stored as absolute position coordinates (X, Y) from the origin (0, 0) in a 1023×1023 coordinate system as shown in FIG. 4A.

Figure 5B:
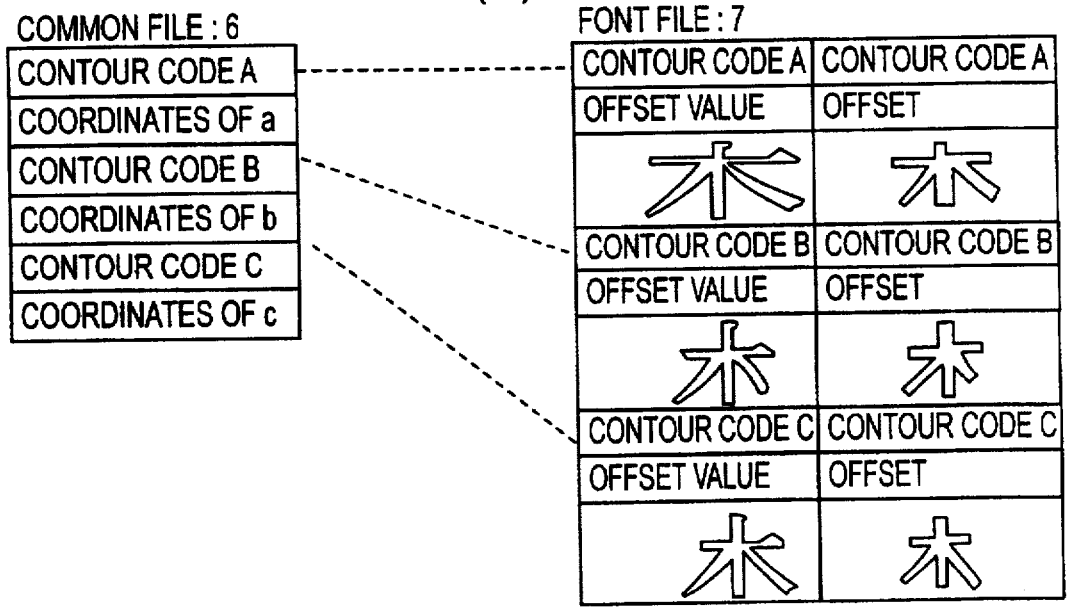

With regard to a Kanji character "Mori" shown in FIG. 4A, for example, identifiers (contour codes) of the individual elements and the coordinates of the common start point a, b and c of the three elements are stored in association with the character code of that Kanji character "Mori" as shown in FIG. 5B.

In the font file 7, the start points of the individual elements of a Mincho character "Mori" (FIG. 4B) are indicated by offsets (offset values) X and Y from the common start points to the start points of the contours of the elements, as shown in this diagram. Likewise, with regard to a Gothic character "Mori" (FIG. 5A) the start points of the individual elements of this character are indicated by offsets (offset values) X and Y from the common start points to the start points of the contours of the elements, as shown in this diagram. As shown in FIG. 5B, the contour codes of the individual elements, the offset values and the contour data of those elements are stored in the font file 7 for each of the Mincho character "Mori" and the Gothic character "Mori."

The character generating process according to the first embodiment of the present invention will be described referring to FIG. 6. First, the host machine 1 sends print data to the printer controller 10. This print data designates a typeface, a character, the size of the character and a figure.

The host interface circuit 2 decodes this print data and sends the decoded data to the command processing block 3. The command processing block 3 decodes the data and sends graphics print data to the graphics processing block 4 and character print data to the character processing block 5, respectively. The graphics processing block 4 develops the graphics data to graphics bit data and writes it into the bit map memory 9.

Figure 6:
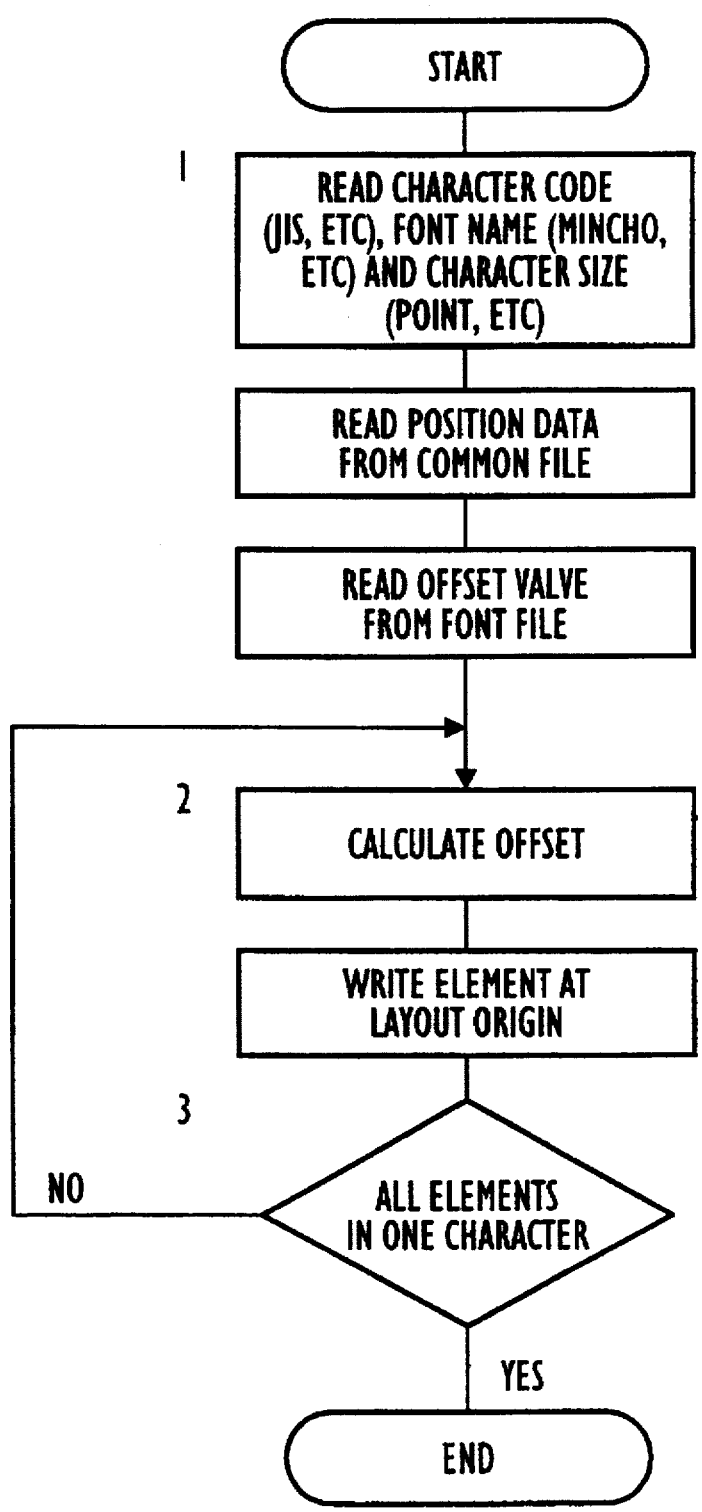
FIG. 6 is a flowchart illustrating a character generating process with the data shown in FIG. 5.

The character processing block 5 develops a character by a process shown in FIG. 6.

(1) The character processing block 5 reads the character code, the font name and the character size, reads the associated contour (element) code and the common start point of each element from the common file 6 based on the character code, and reads the associated contour code, offset values and contour data from the font file 7 based on the character code and the font name.

(2) The character processing block 5 computes the start point of each element by adding the associated offset value to the common start point, and sends the contour data and the computed start point as outline data to the bit data developing circuit 8, with this start point taken as the origin of the arrangement (layout origin).

When the character is specified at this time, the contour data and the start point are multiplied by a scaling factor to reduce or enlarge the coordinate values accordingly.

(3) The character processing block 5 then determines if the above processing is complete for all the elements of one character. If the processing has not been completed, the character processing block 5 returns to step (2). If the processing is complete, the character processing block 5 ends the routine in FIG. 6.

The bit data developing circuit 8 describes the contour from the given layout origins according to the contour data, fills the inside the contour, produces a character pattern with a dot structure, and writes that pattern into the bit map memory 9.

When one page of bit data is written in the bit map memory 9, that one page of bit data is sent to the printer mechanism to be printed.

The common start points of the individual elements are stored in the common file 6 for each typeface of one character, while the offset values of the individual elements and shape data of each element are stored in the font file 7 for each typeface. This common file 6 should neither reflect any actual character design nor store readable characters, but simply needs to store the position data of the start points of the contour elements of the frame of each character. The font file 7 simply needs to have offset values as position data for each typeface.

With regard to Kanji characters "Mori" each having 1023×1023 dots as shown in FIGS. 4 and 5, therefore, two bytes are needed for each of X and Y coordinates of the common start points for the three contour elements, a total of 12 bytes. Further, one byte is needed for each of X and Y coordinates of the offset value for each of the three contour elements for the individual typefaces, a total of 6 bytes. If there are three typefaces, therefore, the total memory capacity required is 30 bytes, which is smaller than the conventionally-required 36 bytes. The greater the number of typefaces is, the greater the memory reduction effect becomes; for instance, with six typefaces, this embodiment needs 48 bytes whereas the prior art needs 72 bytes.

A description will now be given of a second embodiment of the present invention which employs parts as the partial patterns obtained by dividing a character.

Figure 7:
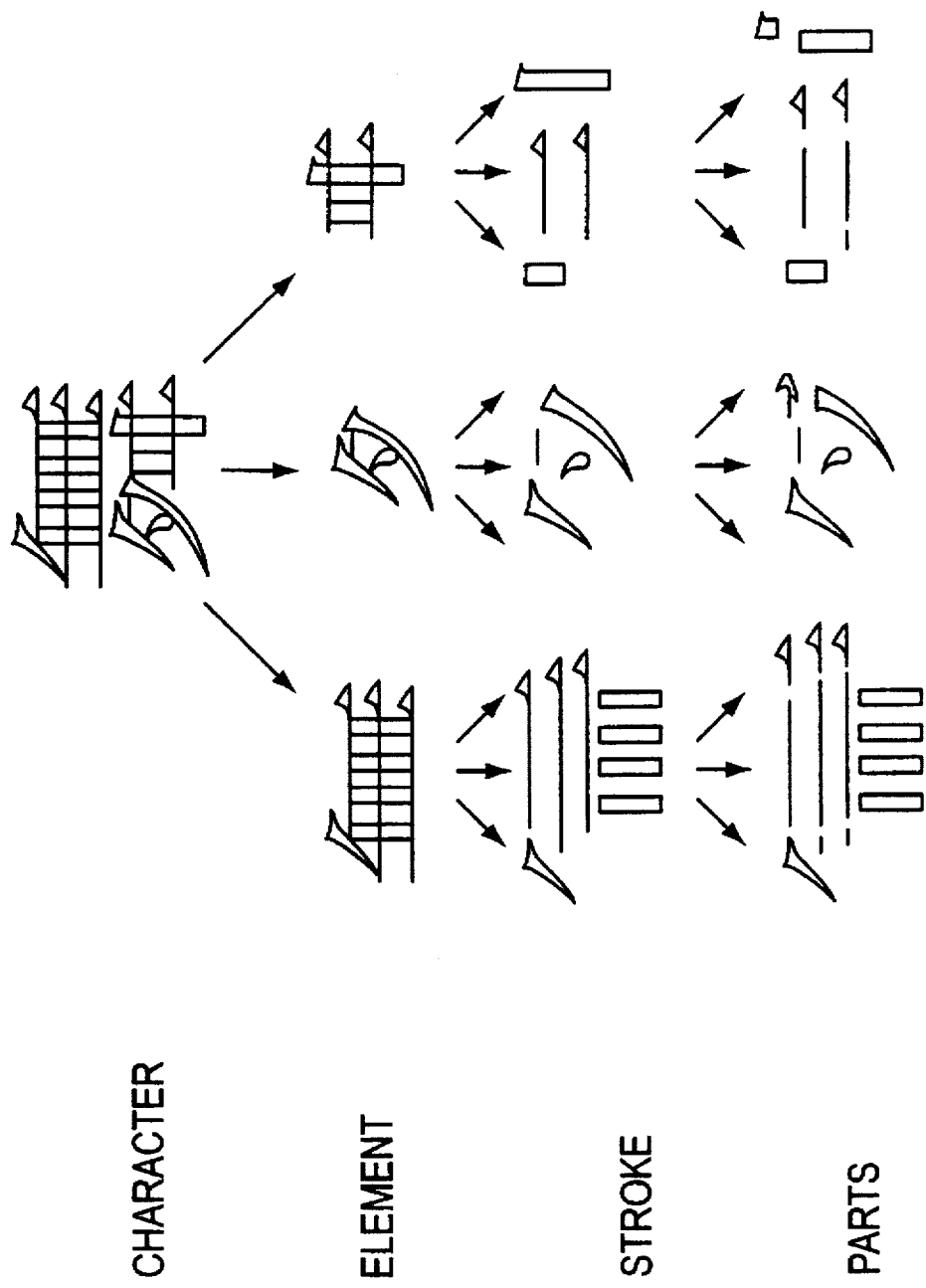
FIG. 7 is an exemplary diagram of partial patterns of a character according to a second embodiment of the present invention.

As shown in FIG. 7, a character consists of continuous partial patterns and can be divided into elements belonging to a radical, a right-hand radical, etc. This element is further divided into strokes determined by the brush moving. The stroke can be broken down into parts, such as start parts, middle parts and end parts, which show design features a brush can create. FIG. 7 illustrates the elements, strokes and parts of a Kanji "Mai."

As a character is divided hierarchically, the number of partial patterns common to characters gradually increases, thus ensuring a reduction in memory capacity accordingly. In this embodiment the concept of the first embodiment is applied to the parts.

Figure 8A:
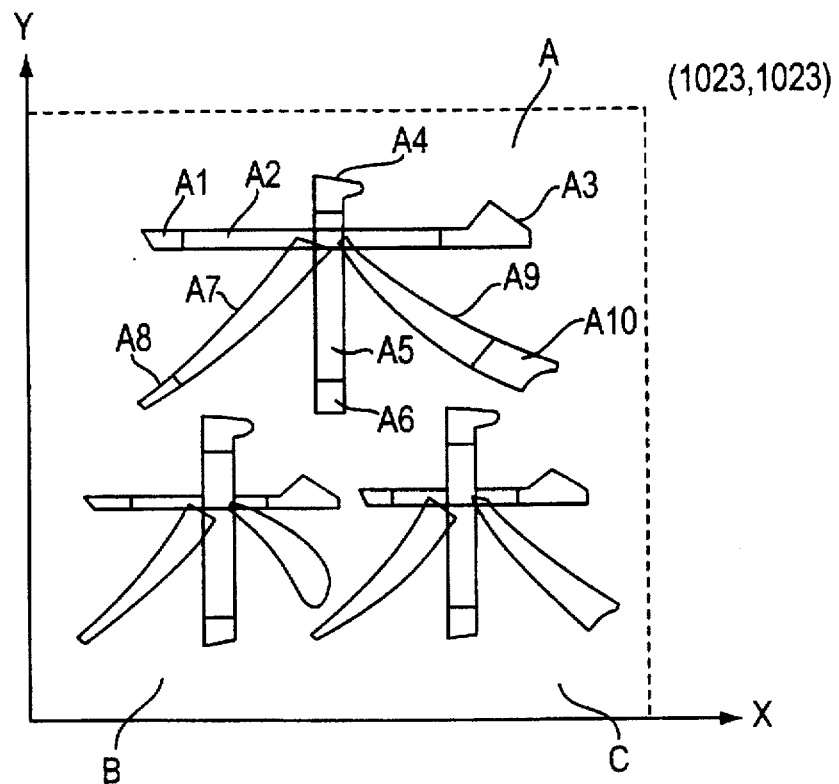
FIGS. 8(A and B) is a diagram of a character pattern according to the second embodiment.

FIG. 8A shows the Mincho character "Mori" in FIG. 4 broken down into parts. For the element A ("Ki"), the horizontal stroke is broken down into three parts of start parts A1, middle parts A2 and end parts A3, the vertical stroke into three parts of upper parts A4, middle parts A5 and lower parts A6, the leftward diagonal stroke into two parts of a diagonal stroke A7 and an end part A8, and the rightward diagonal stroke also into two parts of a diagonal stroke A9 and an end part A10.

Figure 8B:
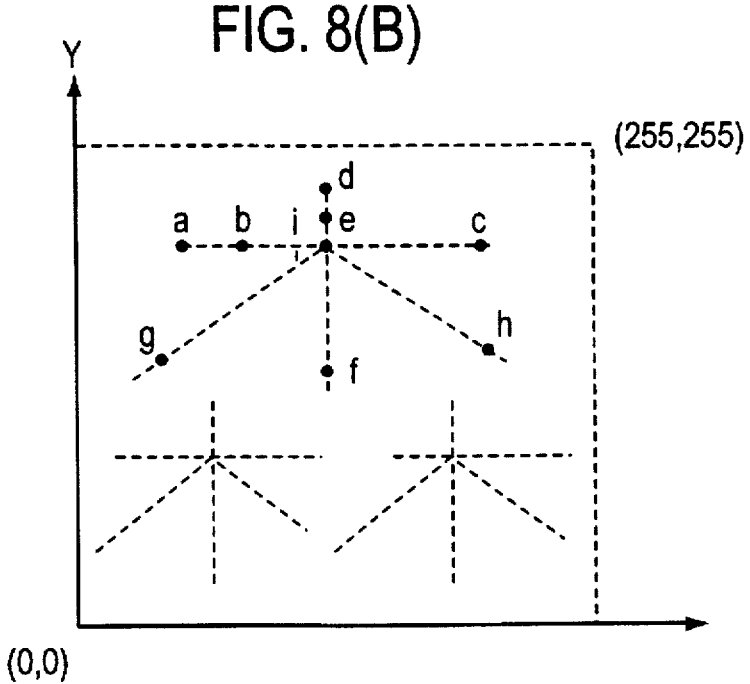

The common start points of the individual parts are a, b, c, d, e, f, g, i and h for the parts A1, A2, A3, A4, A5, A6, A8, A7 and A9, and A10, as indicated on the frame pattern of the Kanji "Mori" in FIG. 8B.

It is apparent from FIG. 8B that the common start points are set in a coordinate system of 255×255 dots, which is ¼ of the set character size of 1023×1023 dots, so that only one byte is needed for each of X and Y coordinates of each common start point.

Figure 9:
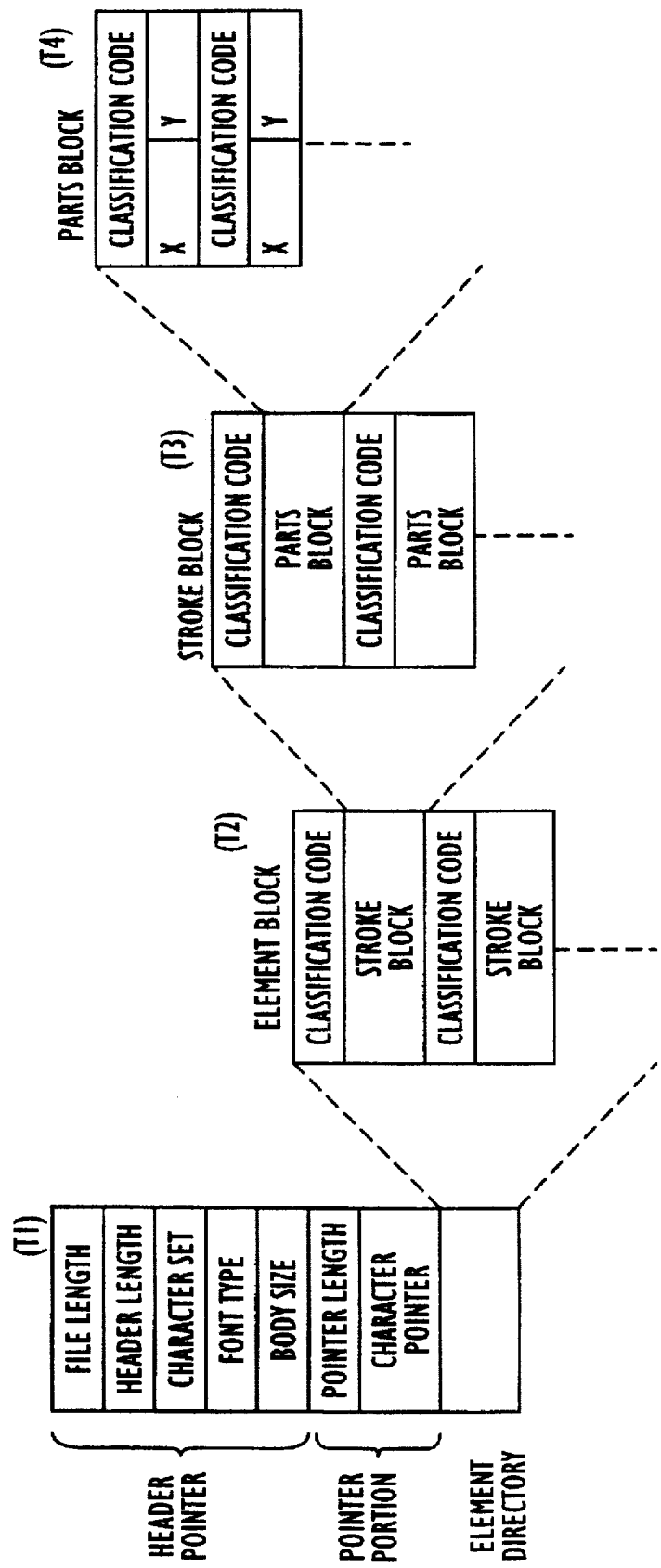
FIG. 9 illustrates the structure of a common file according to the second embodiment.

As illustrated to FIG. 9, the common file 6 that stores the common start points includes a header portion, which consists of a file length indicating the length of the file, a header length indicating the length of the header, a character set, font types and body sizes, a pointer portion consisting of a pointer length and character pointers, and an element directory.

The element directory indicates element blocks T2 each constituting an associated character. Each element block T2 consists of classification codes of elements which constitute one character, and stroke blocks T3 each indicating strokes which constitute one element. Each stroke block T3 consists of classification codes of the individual strokes and part blocks T4 each indicating parts which constitute one stroke. Each part block T4 consists of classification codes of the individual parts and coordinates X and Y of the common start points of the parts.

In the example of FIG. 8B which has three elements A, B and C, the element A consists of a horizontal stroke, a vertical stroke and two diagonal strokes, the horizontal stroke consists of parts A1, A2 and A3, and the common start points of those parts (XA1, YA1), (XA2, YA2) and (XA3, YA3) are stored.

Figure 10:
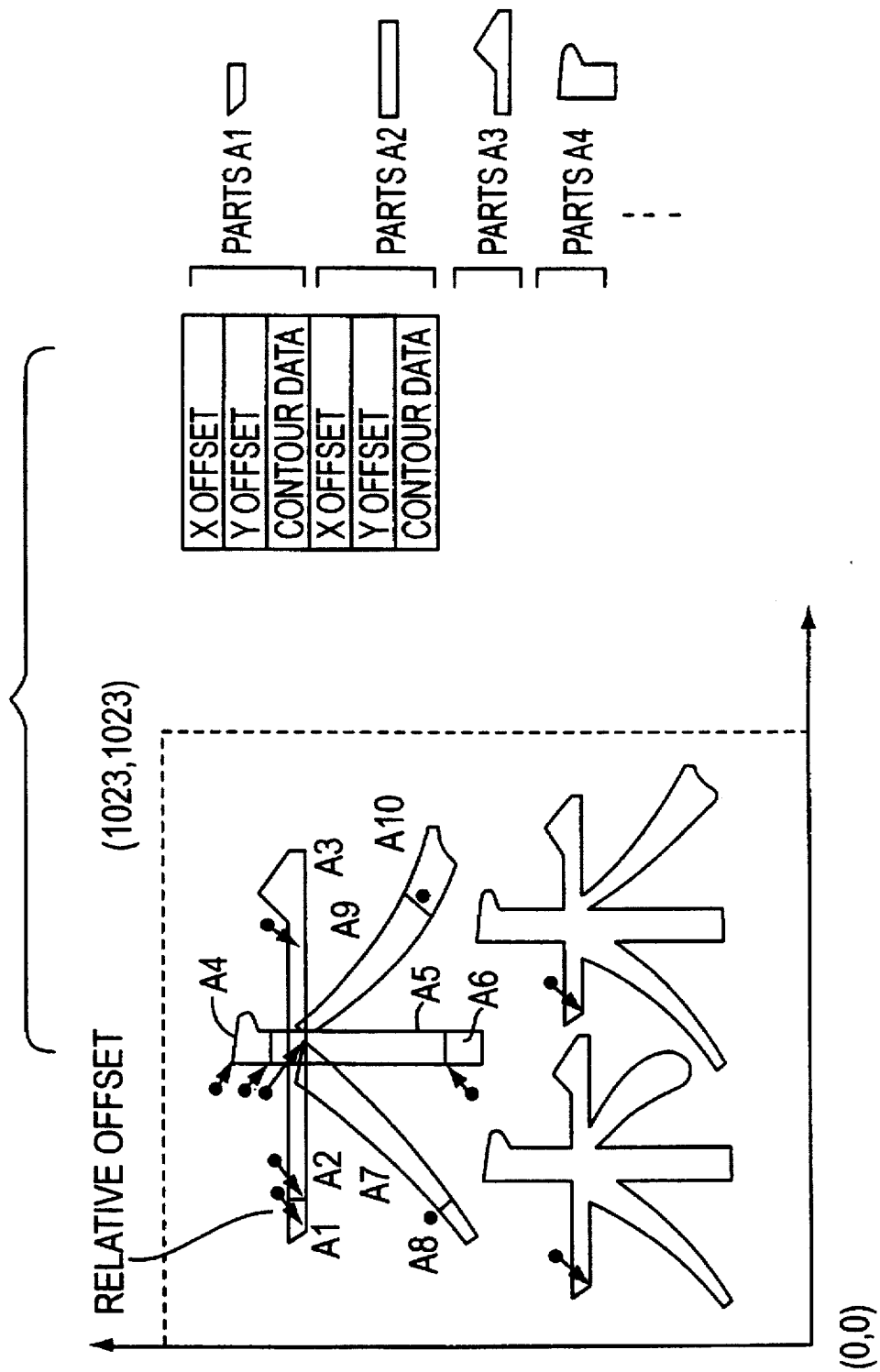
FIG. 10 is an exemplary diagram showing the data structure of a Mincho character according to the second embodiment.

Regarding the font file 7, the Mincho character "Mori" (see FIG. 10) has only to be indicated by relative offsets from the common start points a, b, c, d, e, f, g, i and h to the start points of the parts A1, A2, A3, A4, A5, A6, A8, A7 and A9, and A10 in the coordinate system with a character body size of 1023×1023 dots, as illustrated in the diagram. For instance, the part A1 is constituted of the relative offsets (X offset, Y offset) from the common start point a to the start point of the part A1, and the contour data of the part A1. This is the same for the other parts.

Figure 11:
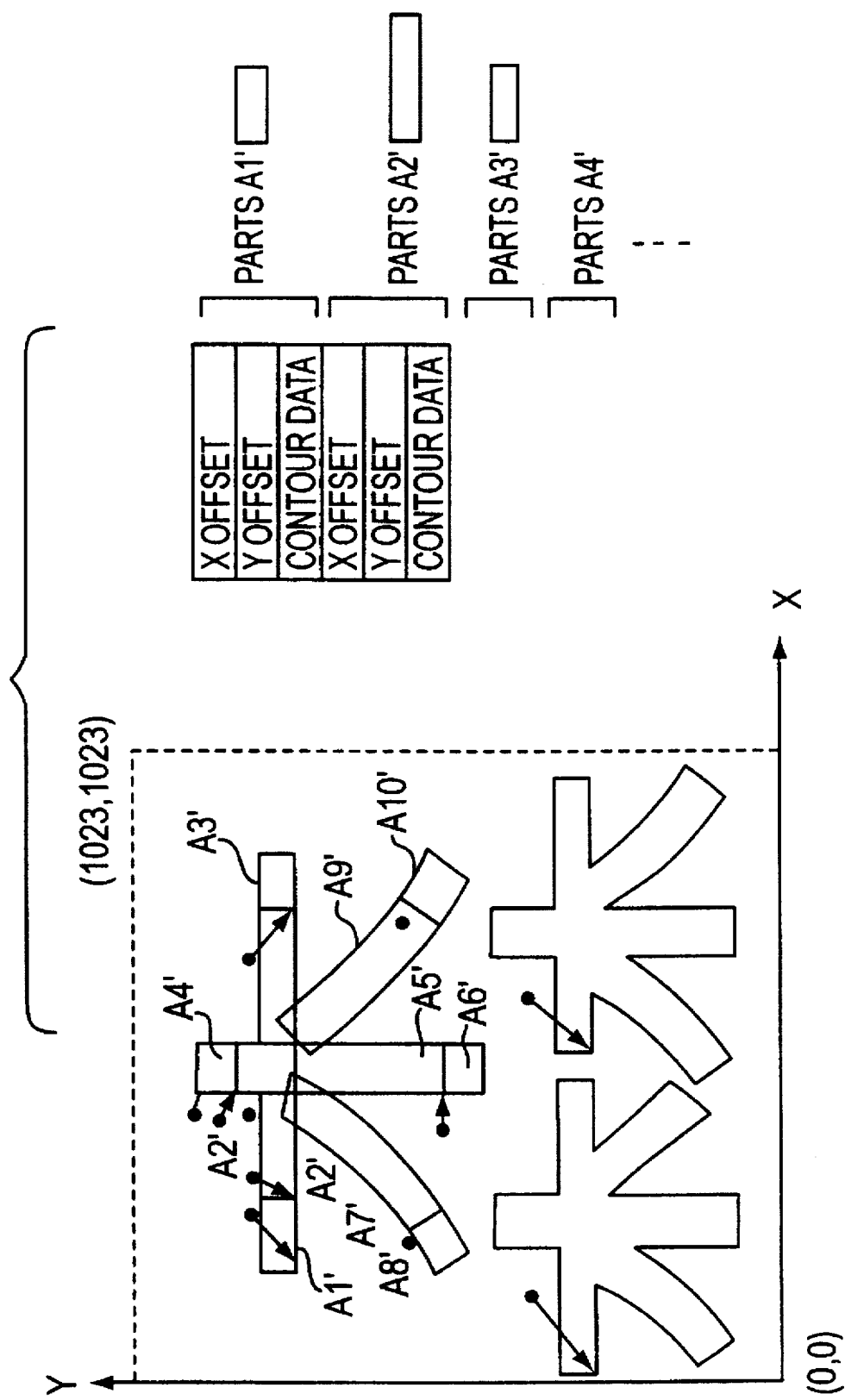
FIG. 11 is an exemplary diagram showing the data structure of a Gothic character according to the second embodiment.

Likewise, the Gothic character "Mori" (see FIG. 11) should only be indicated by relative offsets from the common start points a, b, c, d, e, f, g, i and h, indicated by the small black marks, to the start points of the parts A1', A2', A3', A4', A5', A6', A8', A7' and A9', and A10' in the coordinate system with a character body size of 1023×1023 dots, as illustrated in this diagram. For instance, the part A1' is constituted of the relative offsets (X offset, Y offset) from the common start point a to the start point of the part A1', and the contour data of the part A1'. This is the same for the other parts.

Figure 12A:
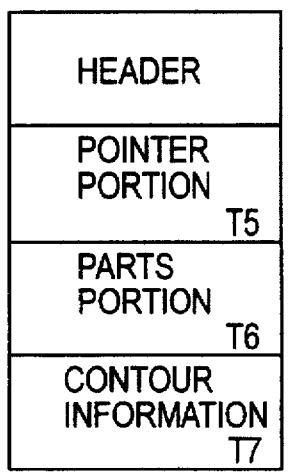
FIGS. 12(A and C) illustrates the structure of an font file according to the second embodiment.

The font file 7 includes a header, a pointer portion T5, a part pointer portion T6 and a contour information part T7, as shown in FIG. 12A. The pointer portion T5 indicates the head address in the part pointer portion T6, which corresponds to the character code and font name, and the part pointer portion T6 indicates the addresses of the individual parts constituting the character in the contour information portion T7, as shown in FIG. 12B.

Figure 12C:
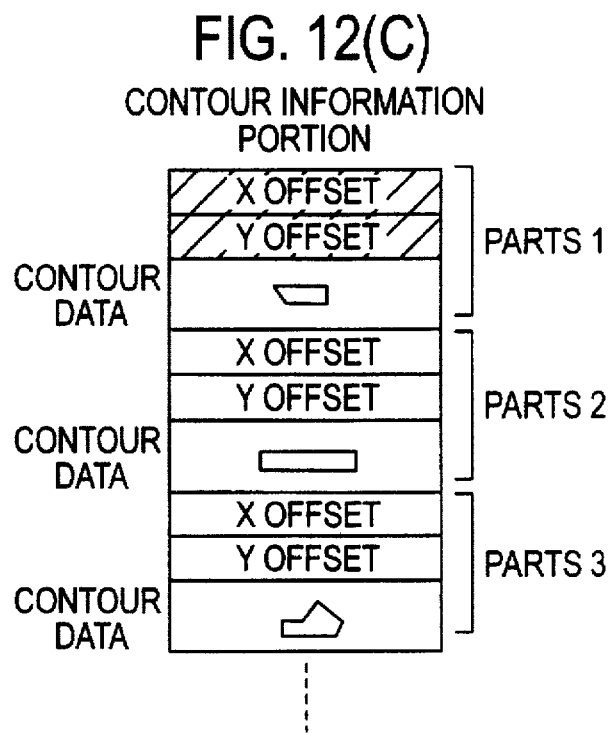
Figure 12B:
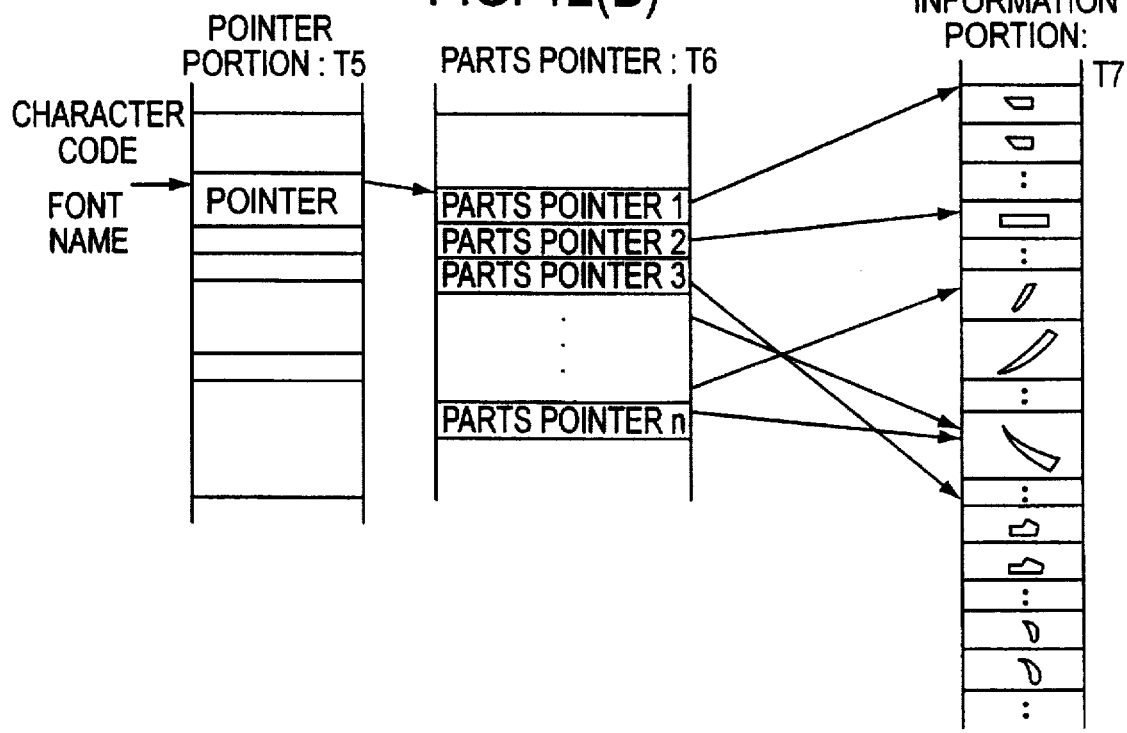

The contour information portion T7 consists of the X offset and Y offset of each part and the contour data of that part, as shown in FIG. 12C.

Figure 13:
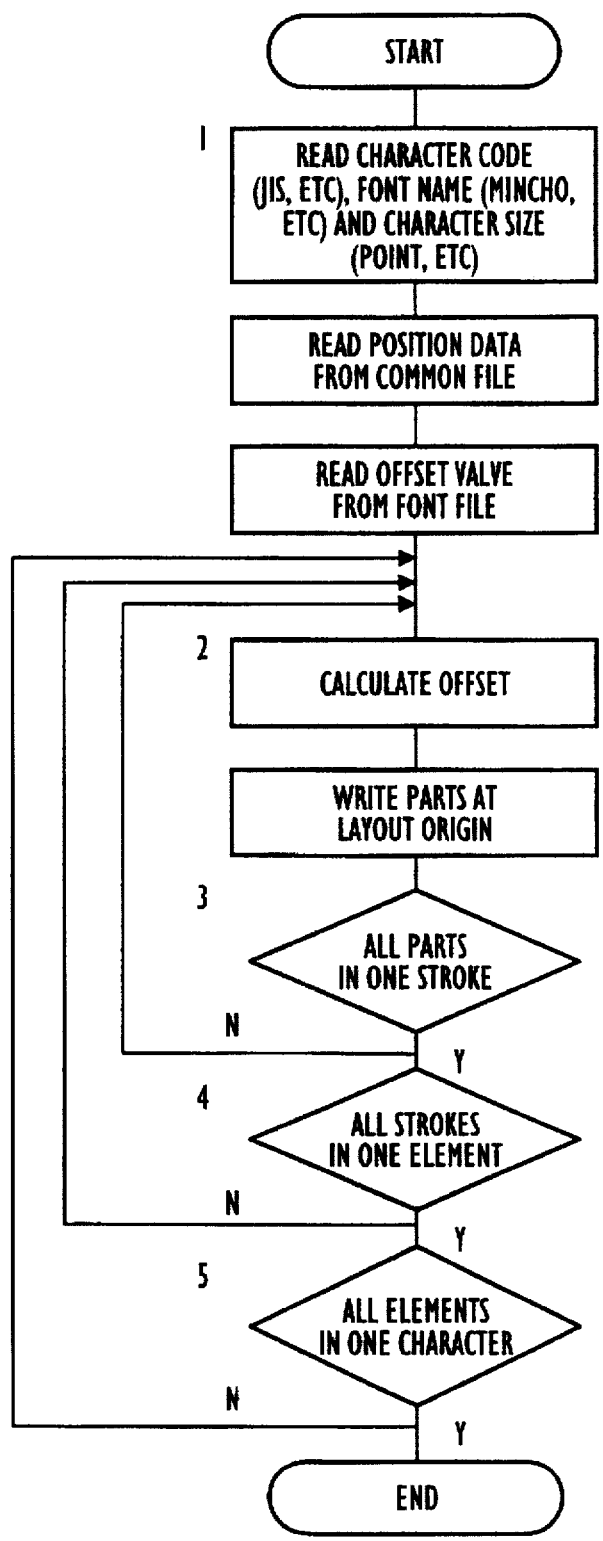
FIG. 13 is a flowchart illustrating a character generating process according to the second embodiment.
Figure 14A:
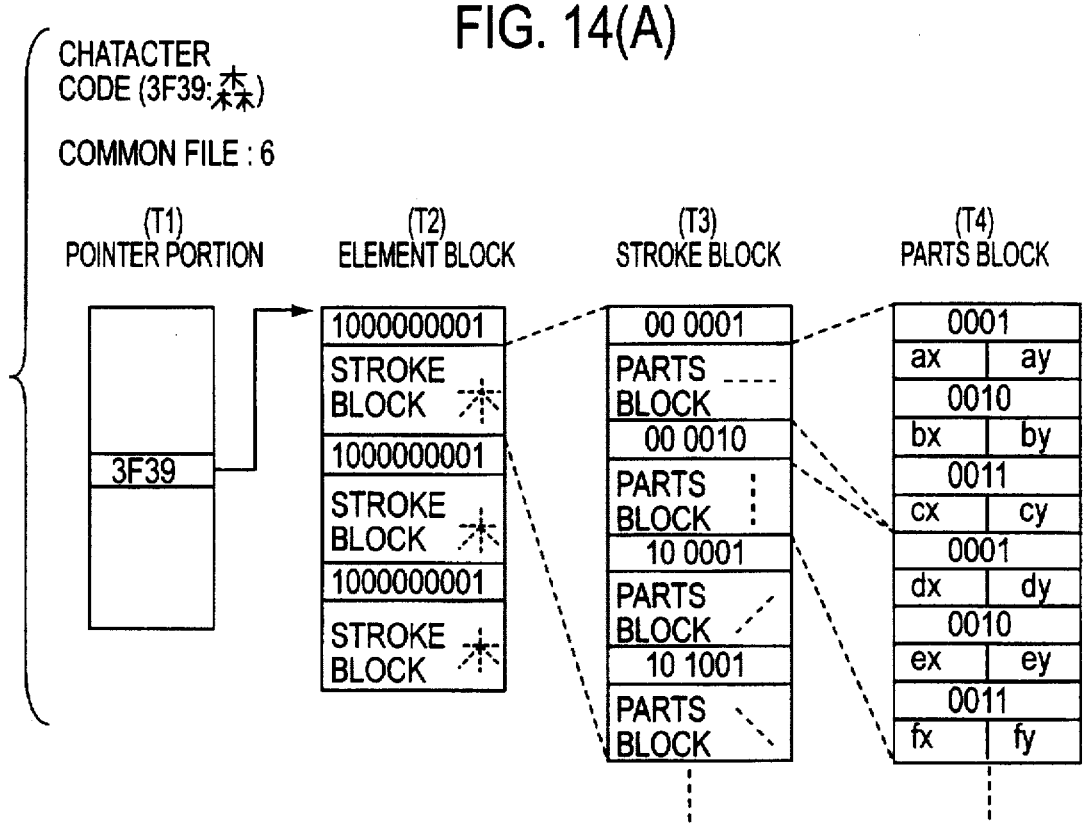
FIG. 14 is a diagram for explaining the operation of the second embodiment.
Figure 14B:
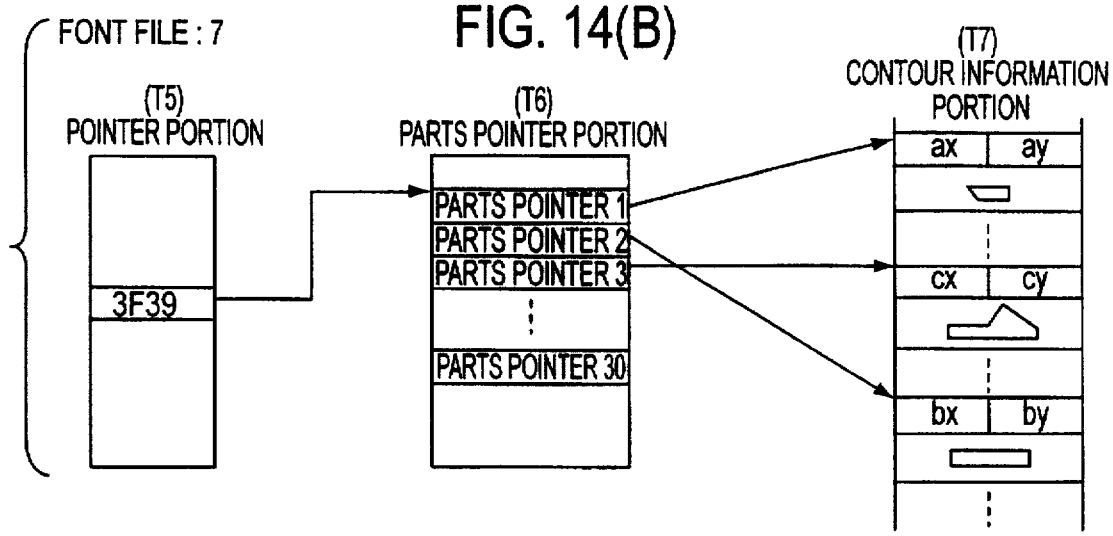

FIG. 13 illustrates a flowchart of the process that is executed in the second embodiment of the present invention, and FIG. 14 presents a diagram for explaining the operation of the second embodiment.

The hardware structure in this example is the same as shown in the block diagram of FIG. 3. First, the host machine 1 sends print data to the printer controller 10. This print data designates a typeface, a character, the size of the character and a figure.

The host interface circuit 2 decodes this print data and sends the decoded data to the command processing block 3. The command processing block 3 sends graphics print data to the graphics processing block 4 and character print data to the character processing block 5, respectively. The graphics processing block 4 develops the graphics data to graphics bit data and writes it into the bit map memory 9.

The character processing block 5 develops a character by a process shown in FIG. 13.

(1) The character processing block 5 reads the character code, the font name and the character size, reads the associated part codes and the common start points of the parts from the common file 6 based on the character code, and reads the associated part codes, offset values and contour data from the font file 7 based on the character code and the font name.

(2) Because the common start points are set in a coordinate system which is ¼ in size of the set character coordinate system as shown in FIG. 8B, the character processing block 5 computes the start points of the individual parts from the following equations based on the common start points and offset values.

start point X=common start point X×4+offset value X start point Y=common start point Y×4+offset value Y The start points taken as the layout origins are written together with the contour data as outline data in the bit data developing circuit 8.

When the character size is specified at this time, the start points are scaled down or up by a scaling factor according to the character size.

(3) The character processing block 5 then determines if the above processing is complete for all the parts in one stroke referring to the associated stroke block T3 in the common file 6. If the processing has not been completed, the character processing block 5 returns to step (2).

(4) If the above processing is complete for all the parts in one stroke, the character processing block 5 then determines if the processing is complete for all the strokes in one element referring to the associated element block T2 in the common file 6. If the processing has not been completed, the character processing block 5 returns to step (2).

(5) If the above processing is complete for all the strokes in one element, the character processing block 5 then determines if the processing is complete for all the elements of one character referring to the element directory in the common file 6. If the processing has not been completed, the character processing block 5 returns to step (2). If the processing is complete, on the other hand, the character processing block 5 ends the routine in FIG. 13.

Then, the bit data developing circuit 8 describes the contour from the given layout origins according to the contour data, fills the inside the contour, produces a character pattern, and writes that pattern into the bit map memory 9. When one page of bit data is written in the bit map memory 9, that one page of bit data is sent to the printer mechanism to be printed.

The above is explained referring to FIG. 14. Upon reception of the character code (JIB code is "3F39" for the Kanji character "Mori" (see FIG. 10, for example) in this example), the character processing block 5 searches the pointer portion T1 in the common file 6 for a pointer corresponding to the character code. This pointer specifies the head address of the elements constituting the Kanji "Mori" in the associated element block T2.

Each element block T2 has element codes and stroke blocks T3 constituting the elements. As the Kanji "Mori" (see FIG. 10) is constituted of three elements "Ki," there are three element codes and three stroke blocks, and the elements are arranged according to the stroking order.

Each stroke block T3 present in the element block T2 has stroke codes and information (part blocks T4) about parts constituting the individual strokes. As the first element "Ki" of the Kanji "Mori" is constituted of four strokes, therefore, the first stroke block T3 has four stroke codes (horizontal stroke, vertical stroke, Hidari-Harai (leftward curved stroke) and Migi-Harai (rightward curved stroke)), and part blocks T4 for each stroke. The strokes are also arranged according to the stroking order.

The part blocks T4 present in each stroke block T3 contain parts constituting the associated stroke and the position data of the parts. With regard to the first stroke of the element "Ki," the horizontal stroke consists of three parts, namely, a stroking start portion (point a), a stroking sustain portion (point b) and a stoking end portion (point c) as shown in FIG. 8A, and has their part codes and position data (X, Y).

The coordinates of the position data are expressed by the 255×255 coordinate system as mentioned earlier, and the parts are arranged in the stroking direction.

Thus, the part blocks for the Kanji "Mori" contain a total of 30 part codes and their position data, which are arranged according to the stroking order.

When the font file 7 receives the font name and character code, the associated pointer in the pointer portion T5 specifies the head address of part pointers in the part pointer portion T6 for the parts constituting the character "Mori."

The part pointer portion T6 contain the pointers of the parts that constitute each character. As the Kanji "Mori" is constituted of 30 parts, the part pointer portion T6 has 30 part pointers for that character consecutively arranged according to the stroking order. That is, the part pointer for the stoking start portion of the first stroke comes first, followed by the part pointer of the stroking sustain portion and the part pointer of the stroking end portion of the first stroke in this order, next comes the part pointer for the stoking start portion of the second stroke, and so forth; this order is quite the same as the order of the associated parts in the common file 6.

Each part pointer specifies the location in the contour information portion T7 which has the position data (X, Y) and contour data of the associated part. The position data is expressed by an offset value from the absolute position, which is stored in the common file 6. For instance, the position data in the contour information portion T7 that is specified by the part pointer 1 is an offset value (relative offset) from the point a in the common file 6.

When the position data of the common start points in the common file 6 and the offset values for each typeface in the font file 7 are read out in this manner, the absolute start points of the parts are calculated and the parts are written at the respective absolute start points according to the contour data of those parts, generating the associated character.

The start coordinates common to the individual typefaces are set and offset values are set for each typeface as mentioned above. In the case of Kanji characters "Mori" (see FIGS. 4 and 5) each having 1023×1023 dots, therefore, one byte is needed for each of X and Y coordinates of the common start points for the 30 parts of each character, a total of 60 bytes. Further, one byte is needed for each of X and Y coordinates of the offset value for each of the 30 parts for each typeface, a total of 60 bytes. If there are three typefaces, therefore, the total memory capacity required is 240 bytes, which is smaller than the conventionally-required 360 (30× 4×3) bytes. The greater the number of typefaces is, the greater the memory reduction effect becomes. For instance, with six typefaces, this embodiment needs 420 bytes whereas the prior art needs 720 bytes.

A third embodiment of the present invention will be described below referring to FIG. 15 which shows another structure of the font file 7.

In this example, the contour information portion T7 is divided into an offset information portion T71 and a contour information portion T72, which are separately specified by the part pointer portion T6.

This modification is made for the following reason. As the offset values and contour data are put together in the second embodiment, if there are different offsets for the same contour, those information cannot be shared by characters. Thus, the offset information is provided separate from the contour data in the third embodiment so that for the same contour, the contour data can be shared, thus considerably reducing the number of pieces of contour data.

Figure 16:
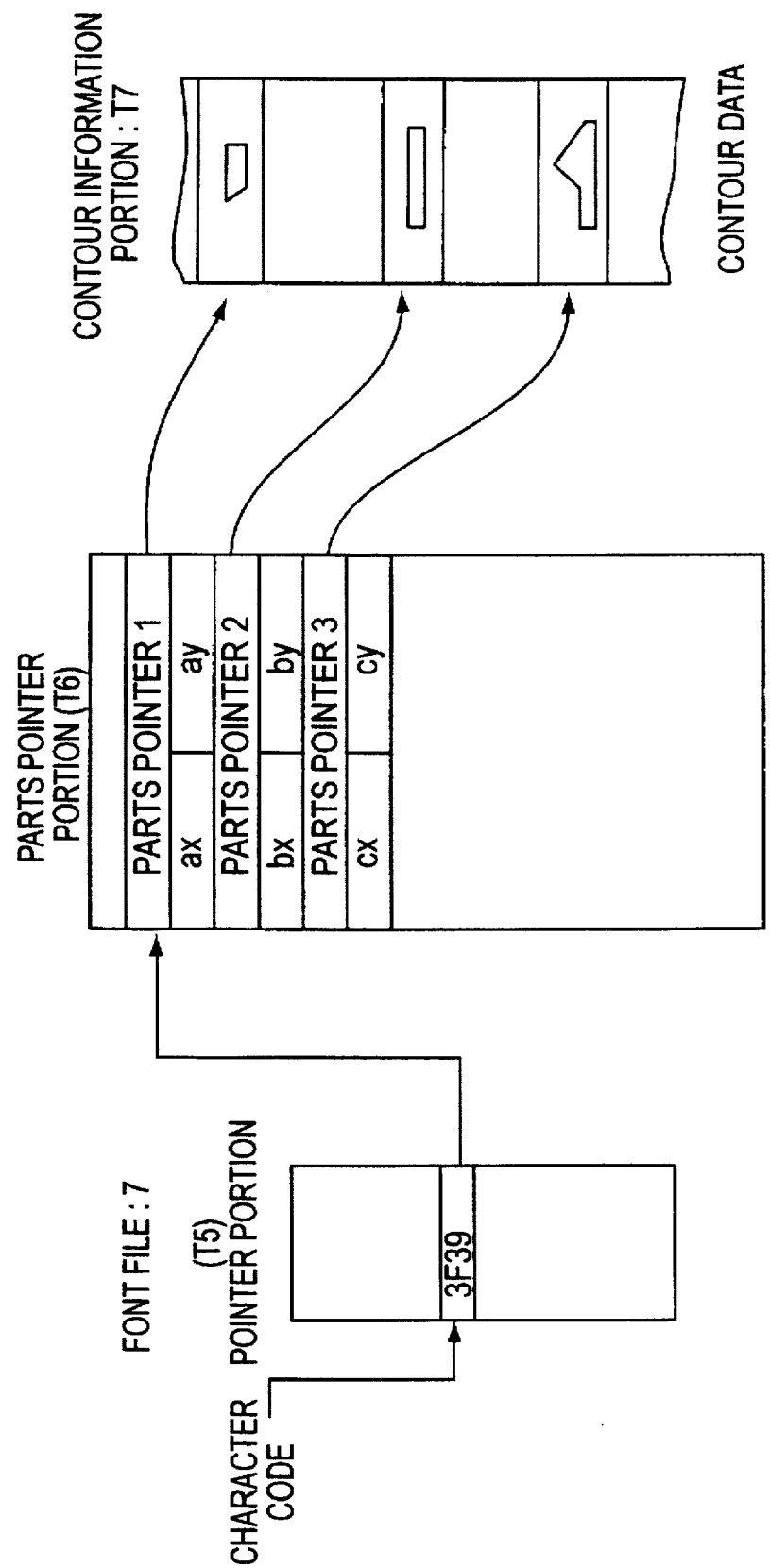
FIG. 16 illustrates the structure of an font file according to a fourth embodiment of the present invention.

Further, the offset information portion may be provided in the part pointer portion T6 as shown in FIG. 16, which is a fourth embodiment of the present invention. That is, the part pointer portion T6 contain part pointers 1, 2, 3 and so forth, which point the respective locations of the contour information portion T7, and offset values (ax, ay), (bx, by) and so forth of the parts indicated by those part pointers.

Figure 15:
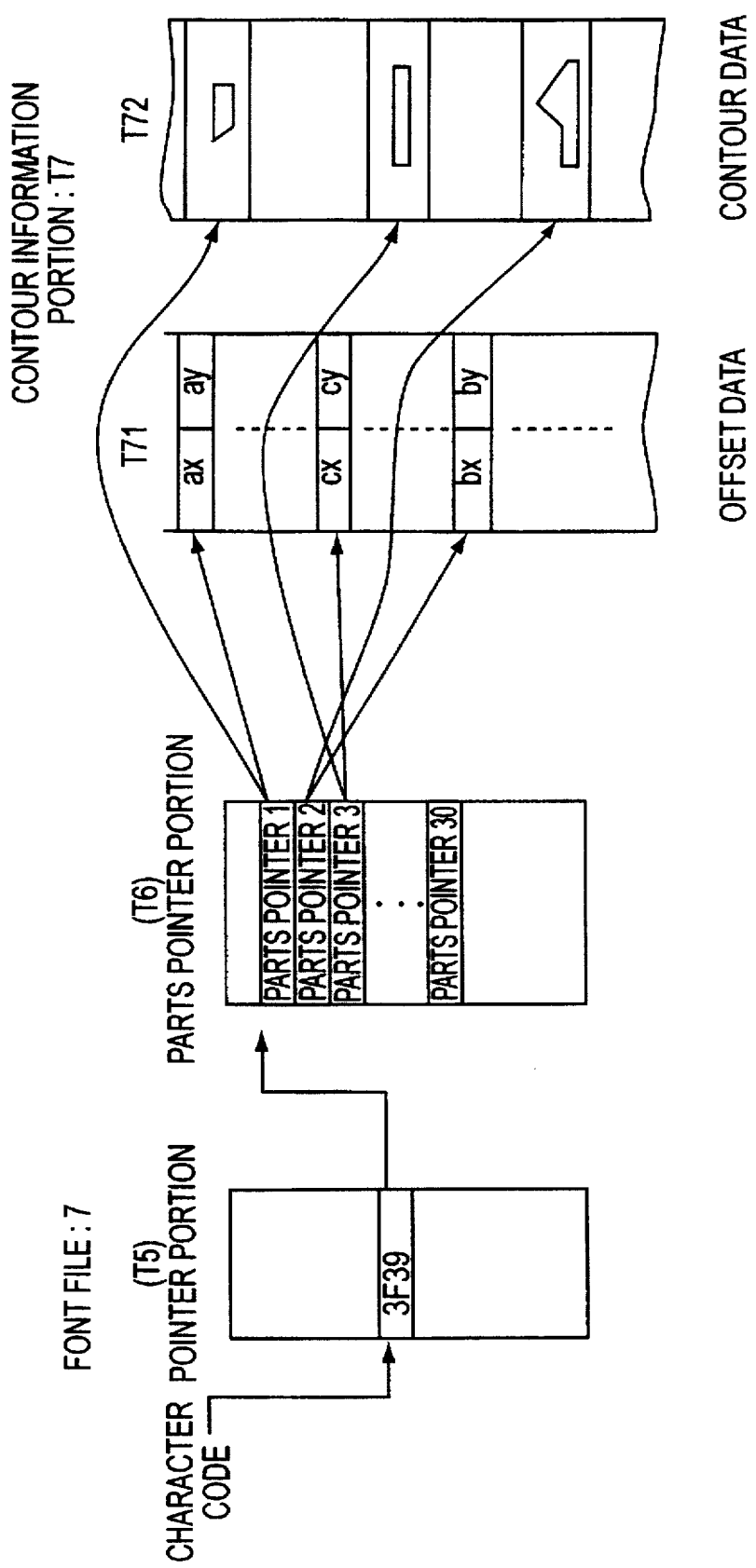
FIG. 15 illustrates the structure of an font file according to a third embodiment of the present invention.

This design eliminates the need for the offset information portion T71 in FIG. 15 and can thus reduce the required memory capacity.

While the partial patterns are indicated by elements and parts in the above-described embodiments, they may be indicated by strokes as well. Although the shape data is indicated by contour data, a dot pattern, the center line and width, and length information may also be used. The foregoing description has been given with reference to the case involving characters with different typefaces as a plurality of character which have different partial patterns arranged in the same manner. But characters having the same radical, such as "Gonben" or "Banzui," likewise have different partial patterns which are arranged in the same manner, so that this invention may be applied to such characters as well.

Even in the first embodiment, the coordinates of each common start point may be expressed by one byte if the coordinate system of the common start points is expressed by 1/n of the character coordinate system and is multiplied by n at the time of computing the coordinates.

A description will now Be given of a fifth embodiment of the present invention in which the hardware structure is the same as is shown in FIG. 3.

Figure 17A:
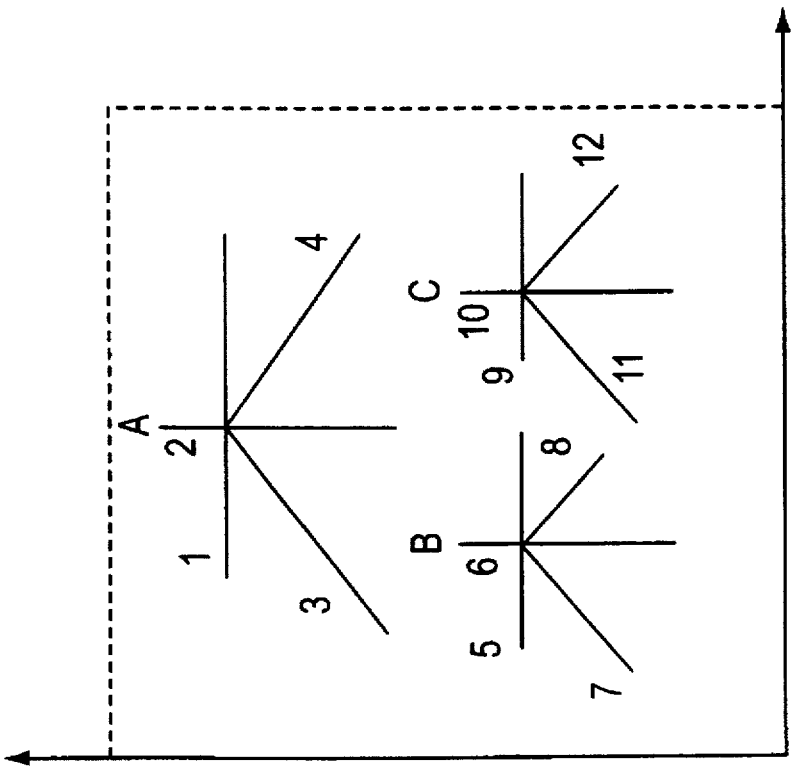
FIGS. 17(A and B) illustrates the structure of a common file according to a fifth embodiment of the present invention.
Figure 17B:
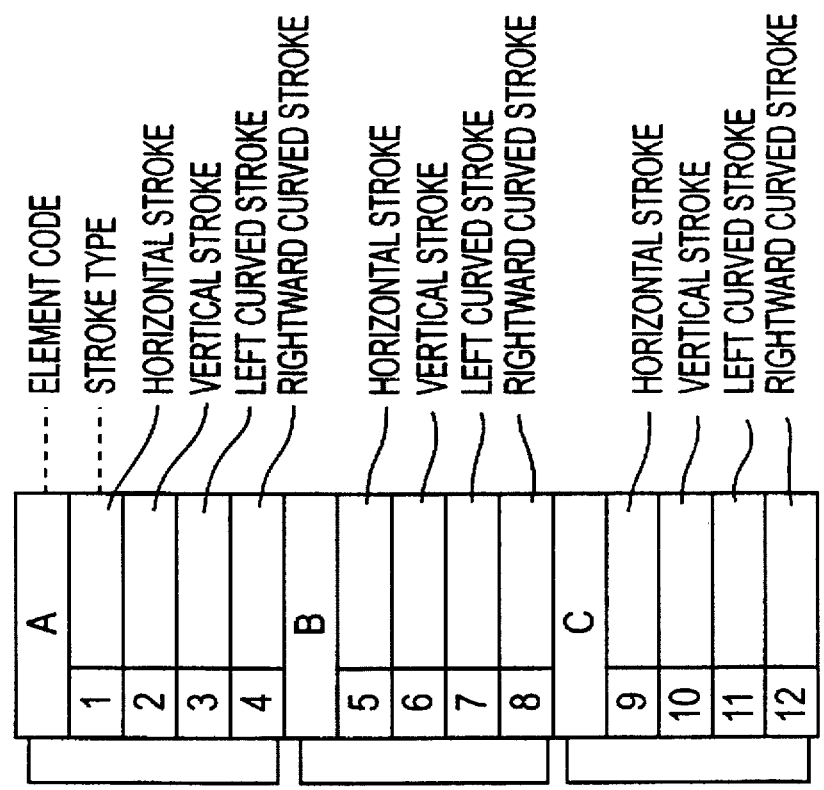

With a Kanji "Mori" shown in FIG. 17A taken as an example, the common file 6 contains the block codes of the three elements ("Ki") A, B and C and structure information of individual strokes which represent the characteristics of each element and thus constitute that element, as shown in FIG. 17B.

In this example, the element "Ki" consists of four strokes of different structures: the horizontal stroke, vertical stroke, leftward curved stroke and rightward curved stroke.

Stored in the font file 7 are hint information of each stroke and contour data for both a Mincho typeface and a (square) Gothic typeface as shown in FIGS. 18 and 19.

Figure 18A:
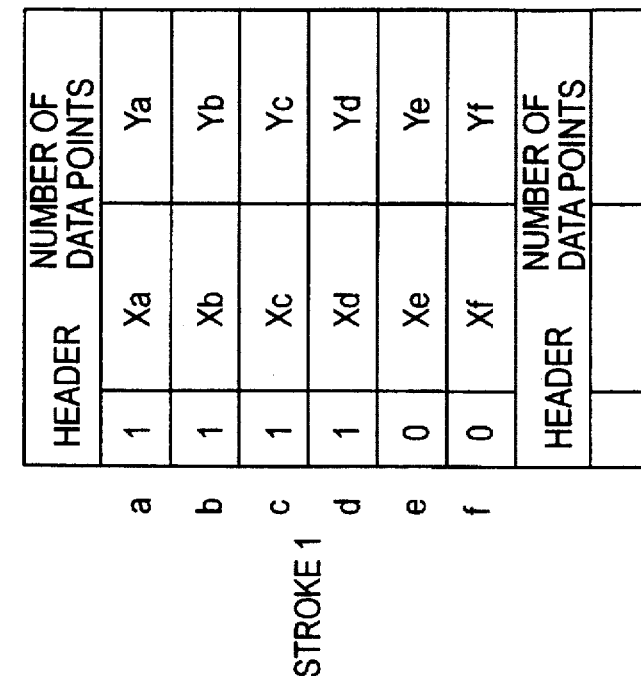
FIGS. 18(A,B and C) is a diagram for explaining data of a Mincho character according to the fifth embodiment.
Figure 18C:
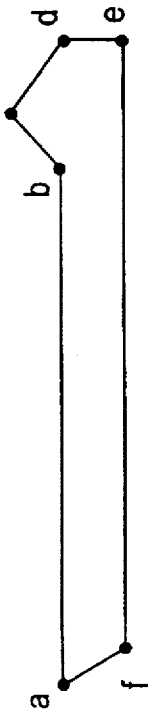
Figure 18B:
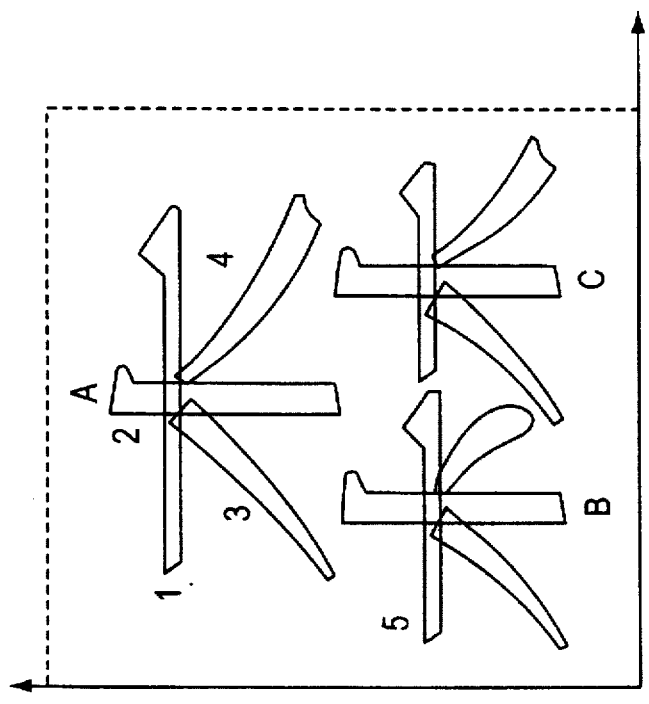

With regard to the Mincho character "Mori" shown in FIG. 18A, for example, for individual points a to f of a stroke 1 shown in FIG. 18B, X and Y coordinates Xa to Xf and Ya to Yf of the respective points a to f are stored as shown in FIG. 18C.

Hint information is set for the coordinates of each point. As the stroke 1 is a horizontal stroke, a reference point of "0" is set for the lower two points e and f in FIG. 18B and a relative point of "1" is set for the remaining four points a to d, as shown in FIG. 18C.

With regard to the square Gothic character "Mori" shown in FIG. 19A, for example, for individual points a to d of a stroke 1 shown in FIG. 19B, X and Y coordinates Xa to Xd and Ya to Yd of the respective points a to d are stored as shown in FIG. 19C.

Hint information is set for the coordinates of each point. As the stroke 1 is a horizontal stroke, a reference point of "0" is set for the lower two points c and d in FIG. 19B and a relative point of "1" is set for the remaining two points a and b, as shown in FIG. 19C.

Figure 20:
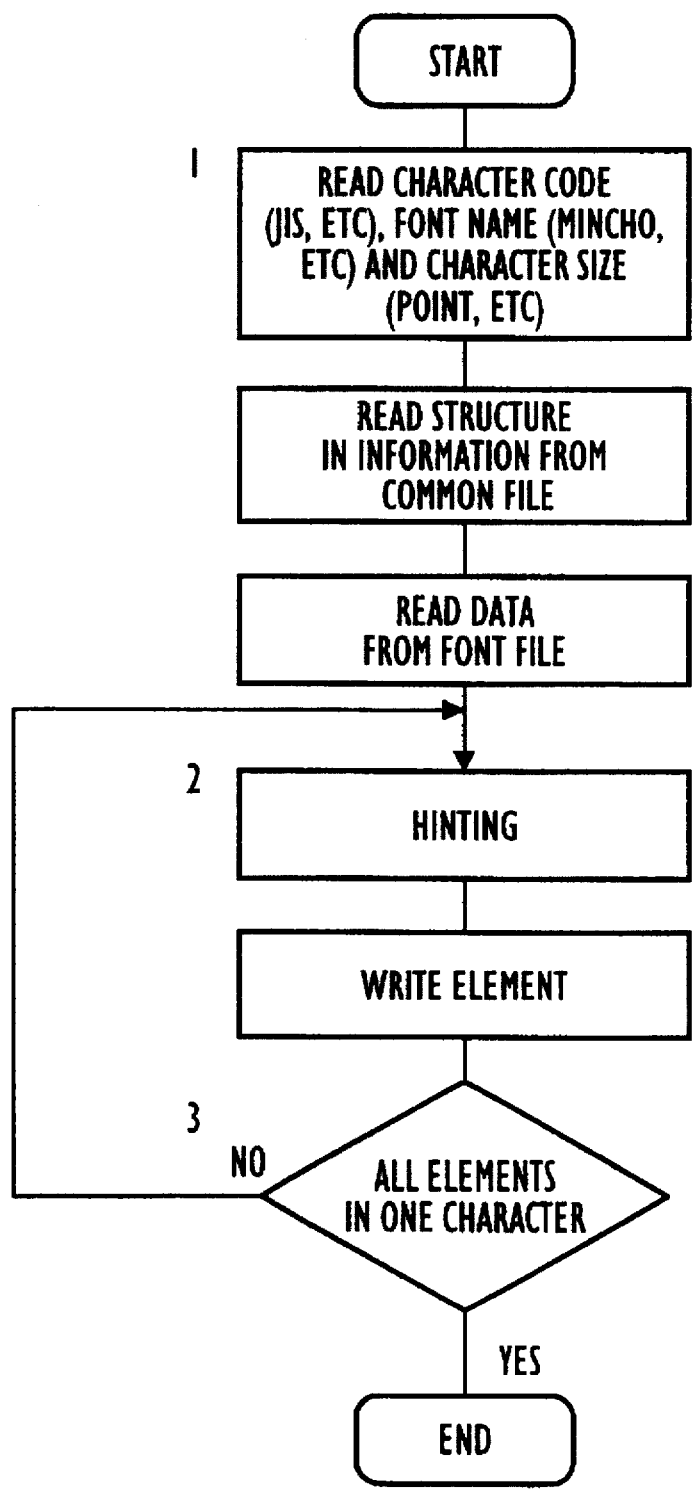
FIG. 20 is a flowchart illustrating a character generating process according to the fifth embodiment.
Figure 21:
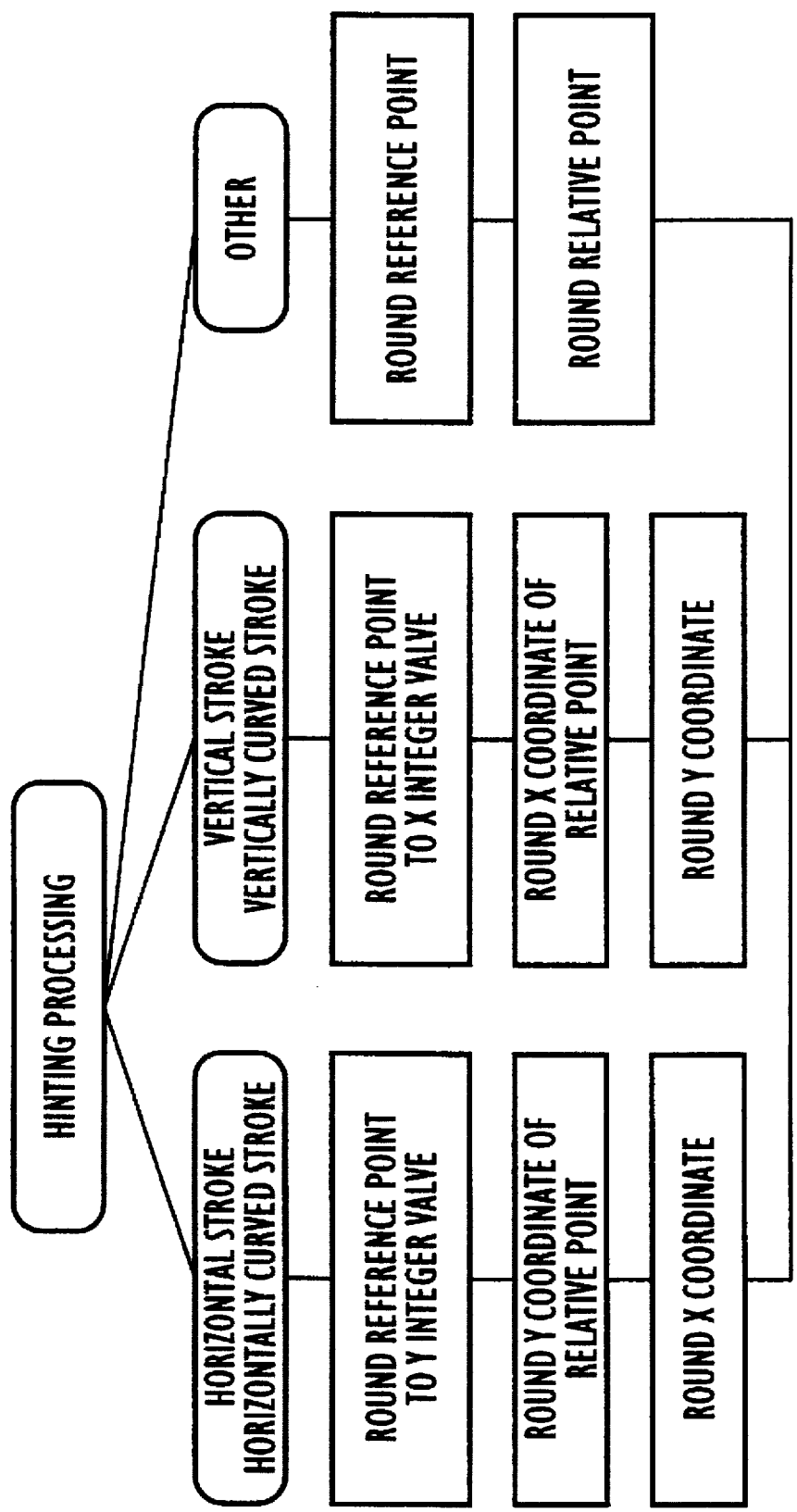
FIG. 21 is a flowchart illustrating a hinting process n the process shown in FIG. 20.
Figure 22:
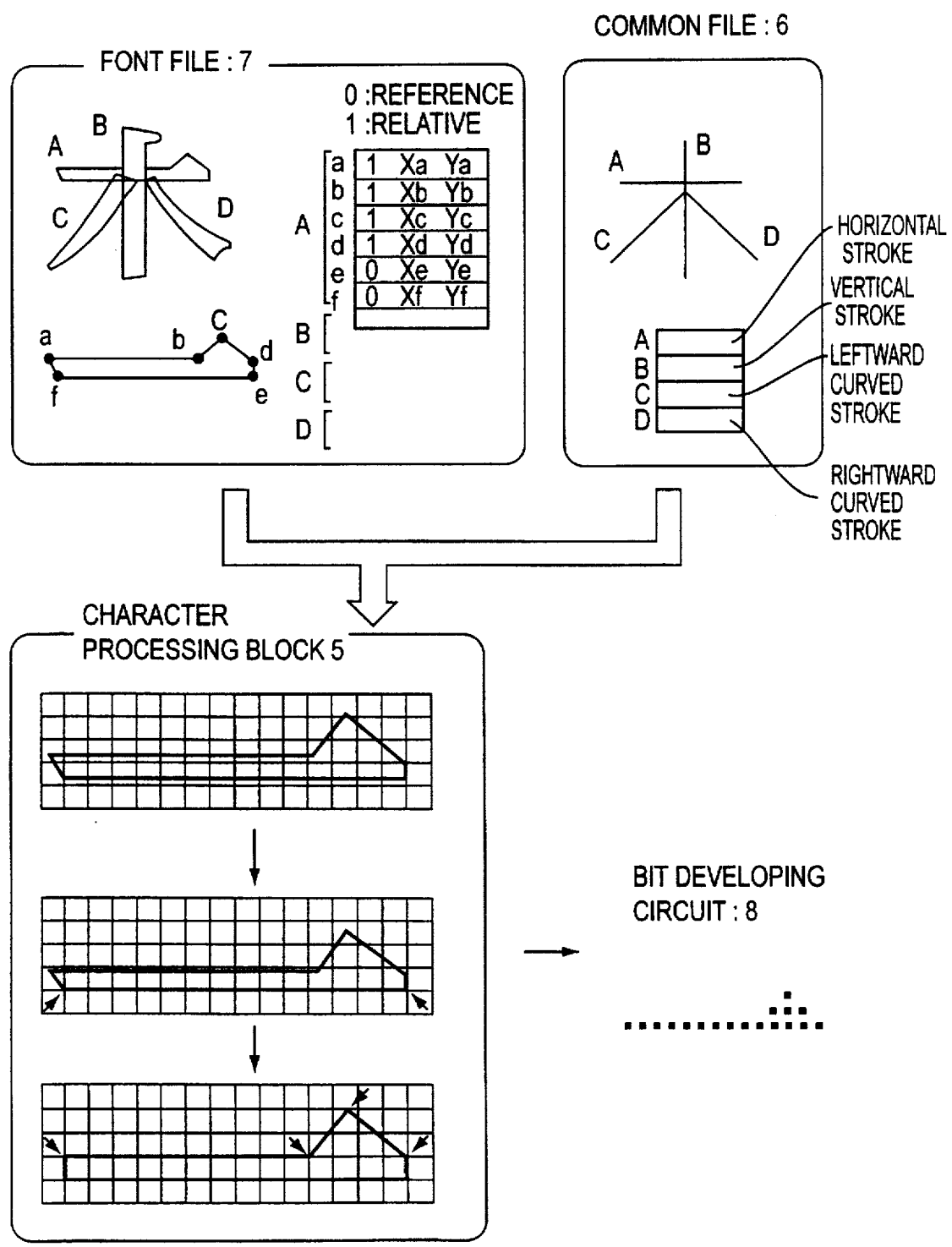
FIG. 22 is a diagram for explaining the character generation in FIG. 20.

FIG. 20 illustrates a flowchart of the character developing process that is executed in the fifth embodiment of the present invention, FIG. 21 illustrates a flowchart of a hinting process executed in the fifth embodiment, and FIG. 22 presents a diagram for explaining the operation of the fifth embodiment.

First, the host machine 1 sends print data to the printer controller 10. This print data designates a typeface, a character, the size of the character and a figure. The host interface circuit 2 decodes this print data and sends the decoded data to the command processing block 3. The command processing block 3 sends graphics print data to the graphics processing block 4 and character print data to the character processing block 5, respectively. The graphics processing block 4 develops the graphics data to graphics bit data and writes it into the bit map memory 9.

The character processing block 5 develops a character by a process shown in FIG. 20.

(1) The character processing block 5 reads the character code, the font name and the character size, reads the structure information of strokes of the associated character, and reads the associated contour data and hint information from the font file 7 based on the character code and the font name.

(2) The character processing block 5 multiplies the contour data of each stroke by a factor determined by the character size before executing the hinting process shown in FIG. 21.

When the stroke is a horizontal stroke or a rightward or leftward curved stroke, the reference points (points e and f, in case of FIG. 18) are rounded to Y integer values, the Y coordinates of the relative points a to d are rounded, finally, the X coordinates of all the points are rounded.

When the stroke is a vertical stroke or a vertically curved stroke, the reference points are rounded to X integer values, the X coordinates of the relative points are rounded, and finally, the Y coordinates of all the points are rounded.

When the stroke is other than the above, the reference points are rounded and the relative points are rounded similarly.

The contour coordinates of each stroke after the execution of the hinting in this manner are written in the bit data developing circuit 8.

(3) The character processing block 5 then determines if the above processing is complete for all the elements in one character. If the processing has not been completed, the character processing block 5 returns to step (2). If the processing is complete, on the other hand, the character processing block 5 ends the routine in FIG. 20.

Then, the bit data developing circuit 8 describes the contour according to the given contour data, fills the inside the contour, produces a character pattern, and writes that pattern into the bit map memory 9, as shown in FIG. 22.

When one page of bit data is written in the bit map memory 9, that one page of bit data is sent to the printer mechanism to be printed.

As the structure information of the individual strokes of each character is stored in the above manner, hinting according to the hint information associated with the stroke structure information can be executed accurately, thus ensuring the proper scaling while keeping the character quality. Further, this processing can be executed based on the structure information of the individual strokes stored in a memory, it can be accomplished easily.

The use of such hint information inevitably increases the memory capacity. But, the structure information of each stroke for the same character is stored in the common file 6 and the contour data specific to individual typefaces and the hint information are provided for each typeface in this embodiment, the structure information of the individual strokes need not be provided for each typeface, resulting in a significant reduction of the memory capacity.

If the structure information of each stroke needs one byte, the stroke structure information takes one byte irrespective of the number of typefaces as in this embodiment, whereas such structure information, if provided for each of m typefaces, needs m bytes accordingly. For instance, since the character "Mori" (see FIG. 18) consists of 12 strokes, only 12 bytes are needed for the structure information in this embodiment, whereas if such structure information is to be provided for each typeface and there are six typefaces, a total of 72 bytes are needed for the structure information. Thus, this embodiment can reduce 60 bytes for each character, and as much as 180 Kbytes for 3,000 characters.

In addition, as the hint information is indicated by one bit, requiring as small a capacity as possible. This embodiment is therefore very advantageous particularly for multi-typeface characters such as Kanji characters.

The following describes a sixth embodiment of the present invention.

Figure 23B:
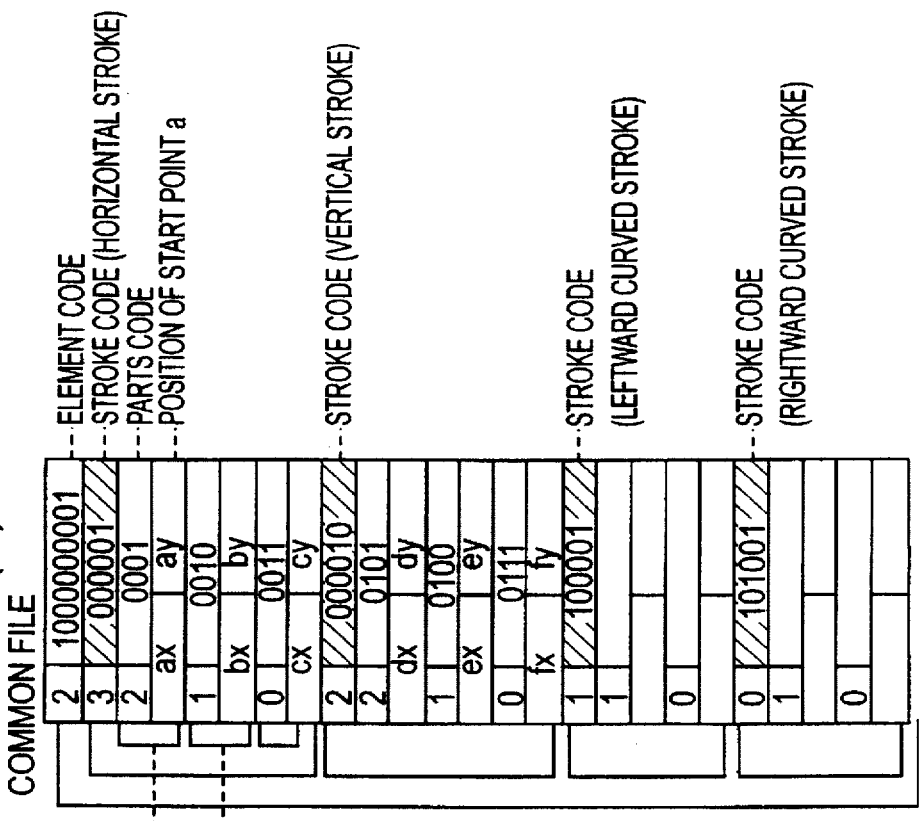
FIGS. 23(A and B) illustrates the structure of a common file according to a sixth embodiment of the present invention.

FIG. 23 presents an exemplary diagram of a common file according to the sixth embodiment, and FIGS. 24 and 25 are diagrams for explaining a font file (part 1 and part 2).

As shown in FIG. 23, a character consists of continuous partial patterns and can be divided into elements belonging to a radical, a right-hand radical, etc. This element is further divided into strokes determined by the brush moving. The stroke can be broken down into parts, such as a left end portion, a straight portion and a right end portion, which show design features a brush can create.

As a character is divided hierarchically, the number of partial patterns common to characters gradually increases, thus ensuring a reduction in memory capacity accordingly.

In this embodiment the concept of the fifth embodiment is applied to the parts, and the merit of the common file 6 is used to reduce the coordinates of the data points.

Figure 23A:
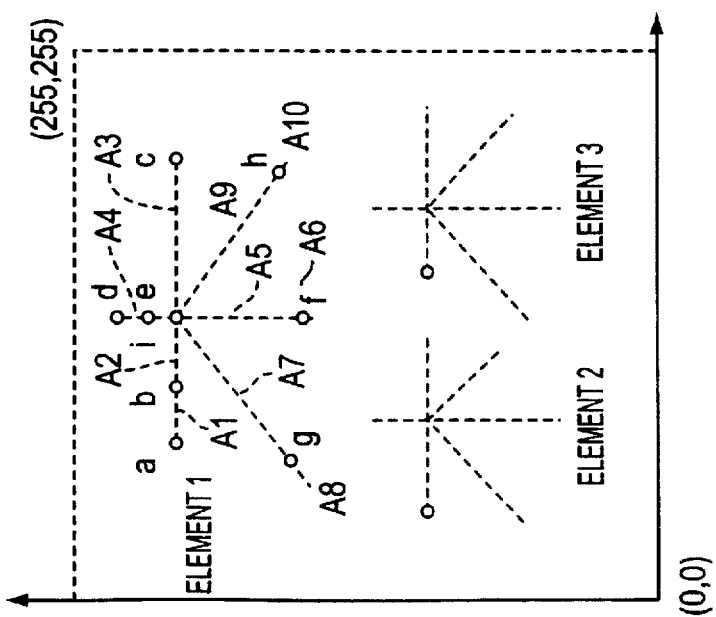

FIG. 23A shows the character "Mori" in FIG. 17 broken down into parts. For the element A ("Ki"), the horizontal stroke is broken down into three parts of a left end A1, a straight stroke A2 and a right end A3, the vertical stroke into three parts of an upper end A4, a straight stroke A5 and a lower end A6, the leftward diagonal stroke into two parts of a diagonal stroke A7 and an end part A8, and the rightward diagonal stroke also into two parts of a diagonal stroke A9 and an end part A10.

The common start points of the individual parts are a, b, c, d, e, f, g, i and h for the parts A1, A2, A3, A4, A5, A6, A8, A7 and A9, and A10, as indicated on the frame pattern in FIG. 23A.

It is seen that the common start points are set in a coordinate system of 255×255 dots, which is ¼ of the actual character size of 1023×1023 dots, so that only one byte is needed for each of X and Y coordinates of each common start point.

The common file 6 that stores the common start points includes element codes, stroke codes, part codes and positions (absolute coordinates) of the start points.

With regard to the character "Mori,"the common file 6 includes the codes of three elements "Ki,"the codes of the individual strokes of each element (the horizontal stroke, vertical stroke, leftward curved stroke and rightward curved stroke for "Ki"), the part codes of each stroke, and the common start points of the individual parts. For the horizontal stroke, there are the part code of the left end, the position (ax, ay) of the start point a at the left end, the part code of the straight stroke, the position (bx, by) of the straight point b of the straight stroke, the part code of the right end, and the position (cx, cy) of the start point c at the right end.

The font file 7 will now be described.

As shown in FIG. 24, the Mincho character "Mori" (see FIG. 24A) has only to be indicated by relative offsets from the common start points a, b, c, d, e, f, g, i and h in the common file 6 to the start points of the parts A1, A2, A3, A4, A5, A6, A8, A7 and A9, and A10 for the Mincho character, in the coordinate system with a character body size of 1023×1023 dots.

For instance, the part A1 for the Mincho character is constituted of the relative offsets (X offset rax, Y offset ray) from the common start point a to the start points of the part A1, and the contour data of the part A1. This is the same for the other parts.

More specifically, pointers are provided for the individual parts for the character code "3F39" of the character "Mori, "and since the left end part A1 in FIG. 24B is expressed by four points a1 to d1, the relative offsets (X offset rax, Y offset rby) from the common start point a to the start points of the part A1, the relative offsets Xa–Xd, Ya–Yd of the points a1 to d1 as the contour data of the part A1, and the hint information (the reference point is "0" and the relative point is "1") should be stored at the locations specified by the pointer of the part A1.

Figure 25C:
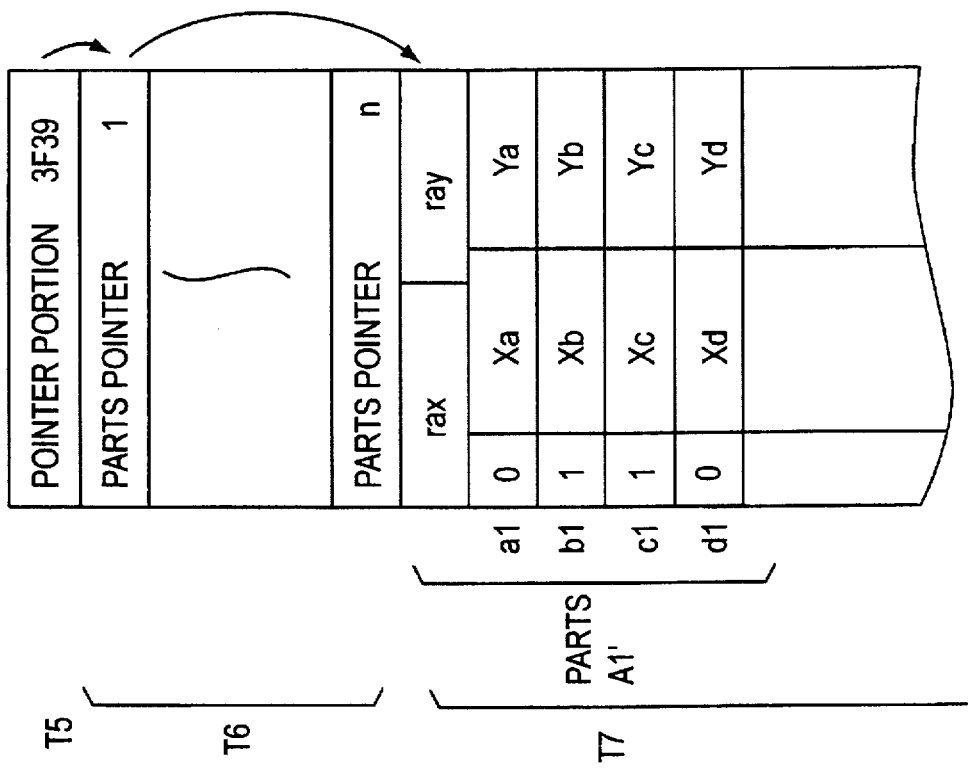
FIGS. 25(A,B and C) is a diagram for explaining data of a Gothic character according to the sixth embodiment.
Figure 25A:
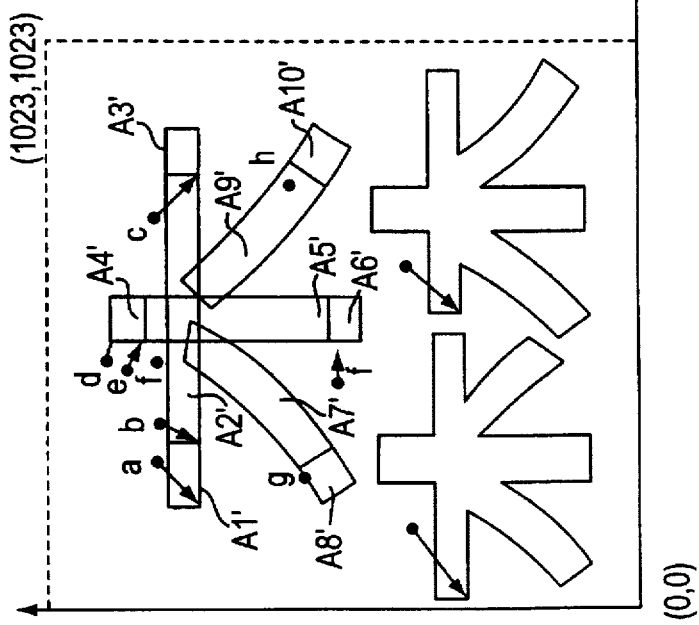

Likewise, as shown in FIG. 25, the square Gothic character "Mori" (see FIG. 25A) should only be indicated by relative offsets from the common start points a, b, c, d, e, f, g, i and h to the start points of the parts A1', A2', A3', A4', A5', A6', A8', A7' and A9', and A10' in the coordinate system with a character body size of 1023×1023 dots.

For instance, the part A1' of the square Gothic character is constituted of the relative offsets (X offset rax, Y offset ray) from the common start point a to the start point of the part A1', and the contour data of the part A1'. This is the same for the other parts.

Figure 25B:
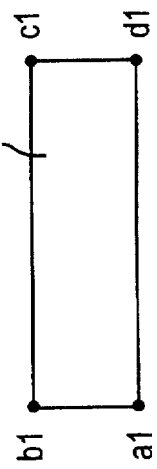

More specifically, pointers are provided for the individual parts for the character code "3F39" of the character "Mori, "and since the left end part A1' in FIG. 25B is expressed by four points a1 to d1, the relative offsets (X offset rax, Y offset rby) from the common start point a to the start points of the part A1', the relative offsets Xa–Xd, Ya–Yd of the points a1 to d1 as the contour data of the part A1', and the hint information (the reference point is "0" and the relative point is "1") should be stored at the locations specified by the pointer of the part A1'.

The font file 7 thus includes a pointer portion T5, a part pointer portion T6 and a contour information part T7, as shown in FIG. 24C and 25C. The pointer portion T5 indicates the head address in the part pointer portion T6, which corresponds to the character code and font name, and the part pointer portion T6 indicates the addresses of the individual parts constituting the character in the contour information portion T7.

The contour information portion T7 consists of the X offset and Y offset of each part, the contour data of that part and the hint information.

Figure 26:
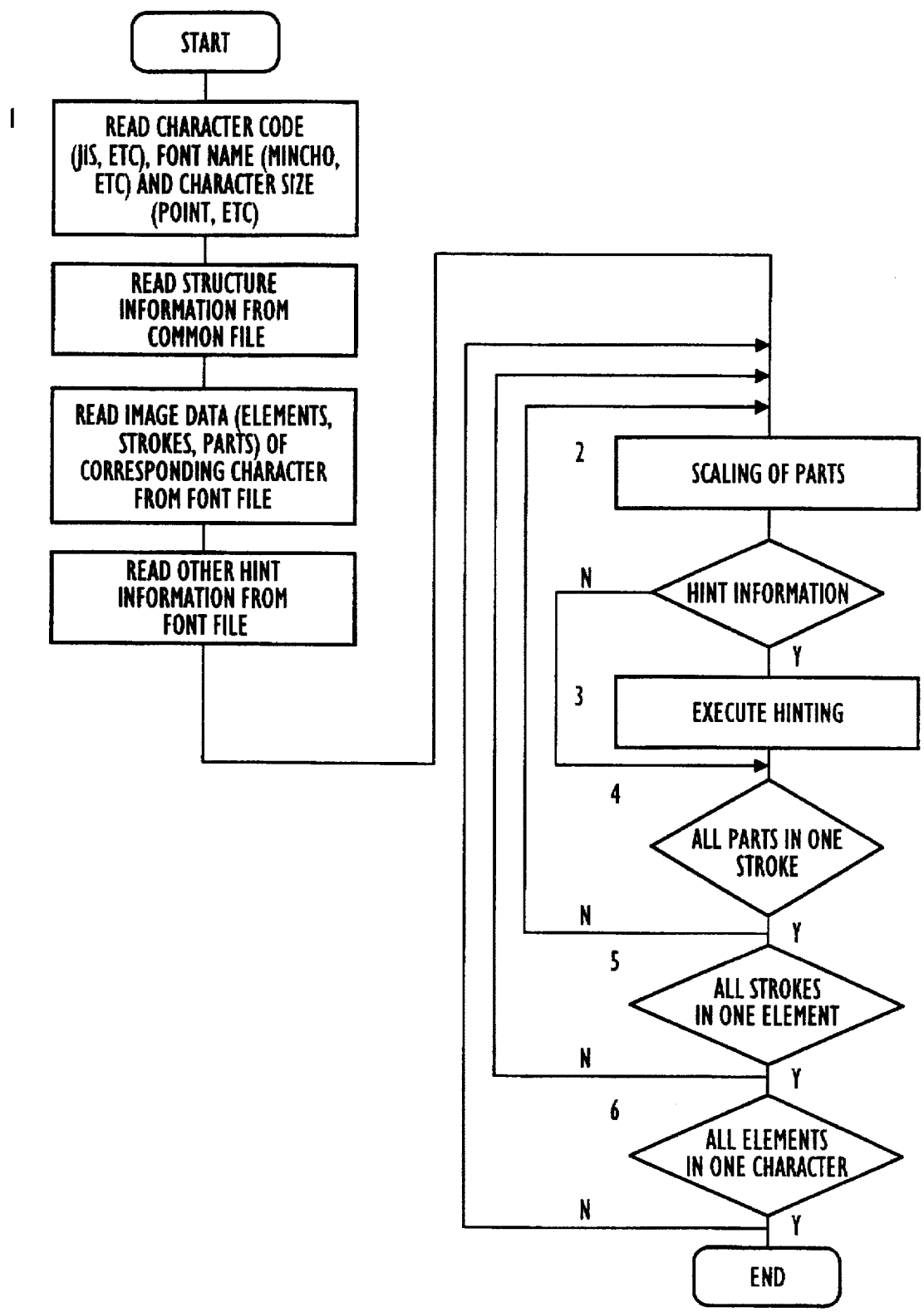
FIG. 26 is a flowchart illustrating a character generating process according to the sixth embodiment.
Figure 27A:
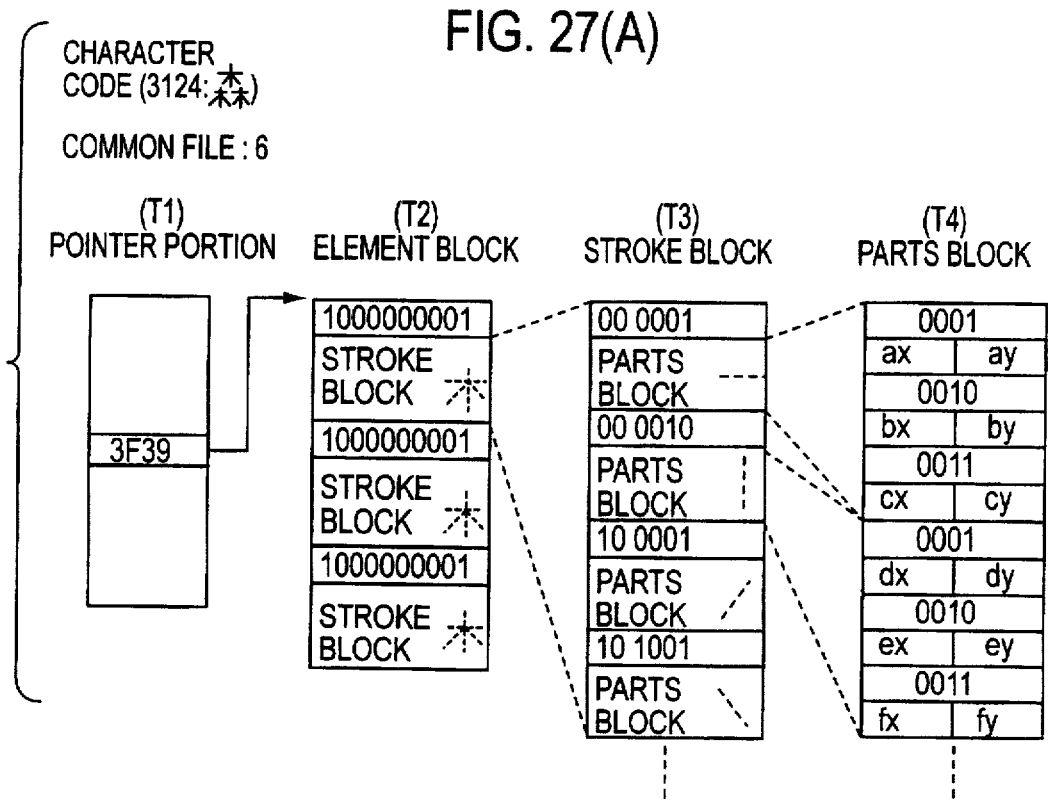
FIG. 27 is a diagram for explaining the character generation in FIG. 26.
Figure 27B:
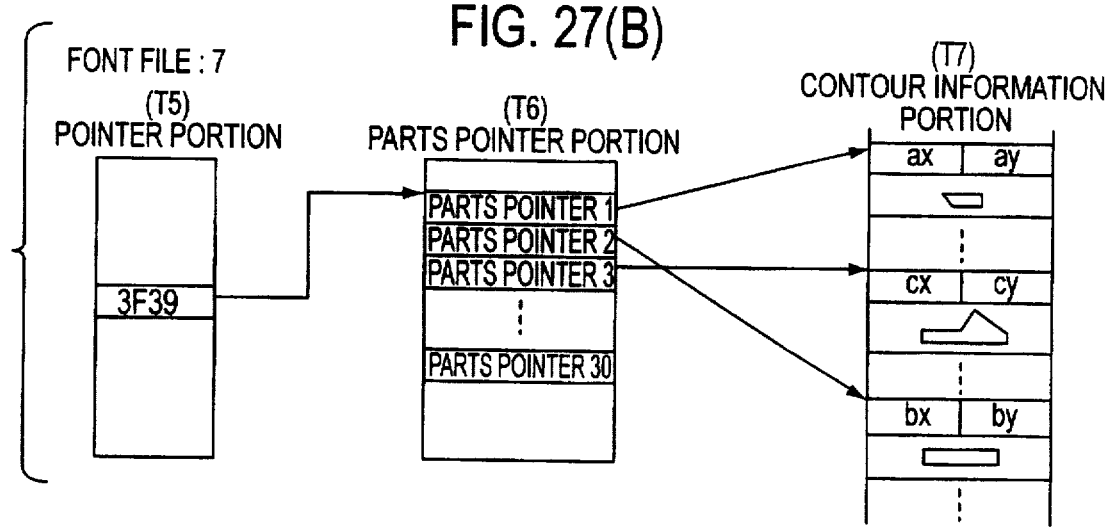

FIG. 26 illustrates a flowchart of the process that is executed in the sixth embodiment of the present invention, and FIG. 27 presents a diagram for explaining the operation of this embodiment.

The hardware structure in this example is the same as shown in the block diagram of FIG. 3. First, the host machine 1 sends print data to the printer controller 10. This print data designates a typeface, a character, the size of the character and a figure.

The host interface circuit 2 decodes this print data and sends the decoded data to the command processing block 3. The command processing section 3 sends graphics print data to the graphics processing block 4 and character print data to the character processing block 5, respectively.

The graphics processing block 4 develops the graphics data to graphics bit data and writes it into the bit map memory 9.

The character processing block 5 develops a character by a process shown in FIG. 26.

(1) The character processing block 5 reads the character code, the font name and the character size, reads the associated element codes, stroke codes (structure information of the strokes), part codes and the common start points of the parts from the common file 6 based on the character code, and reads the associated part codes, offset values, contour data and hint information from the font file 7 based on the character code and the font name.

(2) The character processing block 5 computes the start points of the individual parts from the following equations based on the common start points and offset values.

start point X=common start point nx×4+offset value rnx start point Y=common start point ny×4+offset value rny With the start points taken as the layout origins, the coordinates of each data point of each part are converted into the coordinates of the coordinate system of 1023×1023 dots.

(3) When hinting is specified, each of the coordinates of each data point is multiplied by a factor determined by the designated character size to acquire the coordinates of each data point in the designed character size before executing the hinting process shown in FIG. 21.

When it is seen from the stroke code (structure information) of each part that the stroke is a horizontal stroke or a rightward or leftward curved stroke, the reference points (points e and f, in case of FIG. 18) are rounded to Y integer values, the Y coordinates of the relative points a to d are rounded, and finally, the X coordinates of all the points are rounded.

When the stroke is a vertical stroke or a vertically curved stroke, the reference points are rounded to X integer values, the X coordinates of the relative points are rounded, and finally, the Y coordinates of all the points are rounded.

When the stroke is other than the above, the reference points are rounded and the relative points are rounded similarly.

The contour coordinates of each stroke after the execution of the hinting in this manner are written in the bit data developing circuit 8.

(4) The character processing block 5 then determines if the processing is complete for all the parts in one stroke referring to the associated stroke block T3 (see FIG. 10) in the common file 6. If the processing has not been completed, the character processing block 5 returns to step (2).

(5) If the above processing is complete for all the parts in one stroke, the character processing section 5 then determines if the processing is complete for all the strokes in one element referring to the associated element block T2 in the common file 6. If the processing has not been completed, the character processing section 5 returns to step (2).

(6) If the above processing is complete for all the strokes in one element, the character processing block 5 then determines if the processing is complete for all the elements of one character referring to the element directory in the common file 6. If the processing has not been completed, the character processing block 5 returns to step (2). If the processing is complete, on the other hand, the character processing block 5 ends the routine in FIG. 26.

Then, the bit data developing circuit 8 describes the contour from the given layout origins according to the contour data, fills the inside the contour, produces a character pattern, and writes that pattern into the bit map memory 9.

When one page of bit data is written in the bit map memory 9, that one page of bit data is sent to the printer mechanism to be printed.

The above is explained referring to FIG. 27. Upon reception of the character code (JIS code is "3F39" for the Kanji character "Mori" (see FIG. 24, for example) in this example), the character processing section 5 searches the pointer portion T1 in the common file 6 for a pointer corresponding to the character code. This pointer specifies the head address of the elements constituting the Kanji "Mori" in the associated element block T2.

Each element block T2 has element codes and stroke blocks T3 constituting the elements. As the Kanji "Mori" (see FIG. 24) is constituted of three elements "Ki,"there are three element codes and three stroke blocks, and the elements are arranged according to the stroking order.

Each stroke block T3 present in the element block T2 has stroke codes and information (part blocks T4) about parts constituting the individual strokes. As the first element "Ki" of the Kanji "Mori" is constituted of four strokes, therefore, the first stroke block T3 has four stroke codes (horizontal stroke, vertical stroke, leftward curved stroke and rightward curved stroke), and part blocks T4 for each stroke. The strokes are also arranged according to the stroking order.

The part blocks T4 present in each stroke block T3 contain parts constituting the associated stroke and the position data of the parts. With regard to the first stroke of the element "Ki,"the horizontal stroke consists of three parts, namely, a stroking start portion (point a), a stroking sustain portion (point b) and a stoking end portion (point c), and has their part codes and position data (X, Y).

The coordinates of the position data are expressed by the 255×255 coordinate system as mentioned earlier, and the parts are arranged in the stroking direction.

Thus, the part blocks for the Kanji "Mori" contain a total of 30 part codes and their position data, which are arranged according to the stroking order.

When the font file 7 receives the font name and character code, the associated pointer in the pointer portion T5 specifies the head address of part pointers in the part pointer portion T6 for the parts constituting the character "Mori."

The part pointer portion T6 contain the pointers of the parts that constitute each character. As the Kanji "Mori" is constituted of 30 parts, the part pointer portion T6 has 30 part pointers for that character consecutively arranged according to the stroking order.

That is, the part pointer for the stoking start portion of the first stroke comes first, followed by the part pointer of the stroking sustain portion and the part pointer of the stroking end portion of the first stroke in this order, next comes the part pointer for the stoking start portion of the second stroke, and so forth; this order is quite the same as the order of the associated parts in the common file 6.

Each part pointer points the location in the contour information portion T7 which has the position data (X, Y) of the start point and contour data (including hint information)

of the associated part. The position data is expressed by an offset value from the common position, which is stored in the common file 6. For instance, the position data in the contour information portion T7 that is specified by the part pointer 1 is an offset value (relative offset) from the point a in the common file 6.

When the position data of the common start points in the common file 6 and the offset values for each typeface in the font file 7 are read out in this manner, the absolute start points of the parts are calculated and are then subjected to scaling, the hinting is performed next, and the parts are written at the respective absolute start points, generating the associated character.

The start coordinates common to the individual typefaces are set and offset values are set for each typeface as mentioned above. In the case of Kanji characters "Mori" (see FIGS. 24 and 25) each having 1023×1023 dots, therefore, one byte is needed for each of X and Y coordinates of the common start points for the 30 parts of each character, a total of 60 bytes. Further, one byte is needed for each of X and Y coordinates of the offset value for each of the 30 parts for each typeface, a total of 60 bytes.

If there are three typefaces, therefore, the total memory capacity required is just 240 bytes, smaller than 360 (30× 4×3) bytes that are needed in the prior art which displays the parts at their absolute positions for each typeface and needs two bytes for each of X and Y coordinates. The greater the number of typefaces is, the greater the memory reduction effect becomes. For instance, with six typefaces, this embodiment needs 420 bytes whereas the prior art needs 720 bytes.

Figure 28:
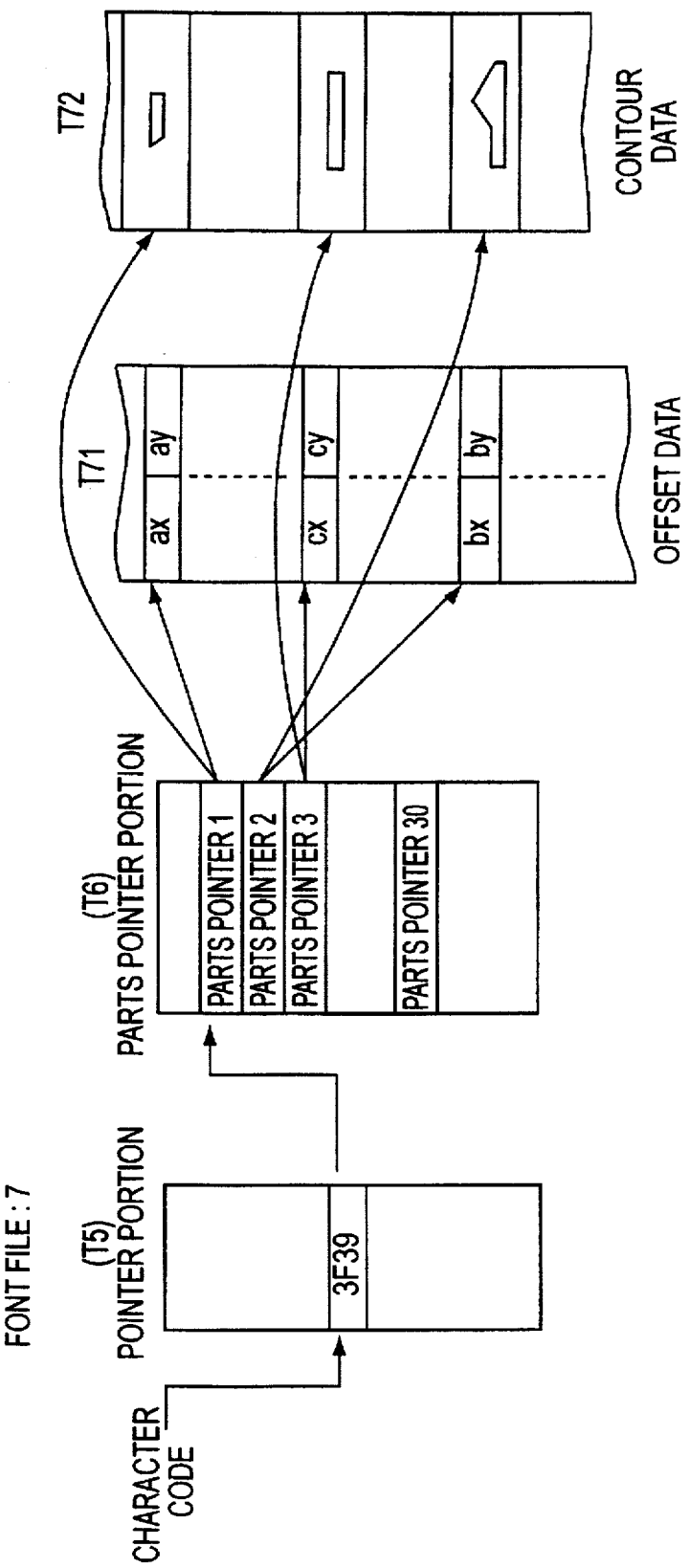
FIG. 28 illustrates the structure of an font file according to a seventh embodiment of the present invention.

FIG. 28 is an exemplary diagram for a seventh embodiment of the present invention, showing another structure of the font file 7.

In this example, the contour information portion T7 is divided into an offset information portion T71 and a contour information portion T72 (including contour data and hint information). Those portions T71 and T72 are separately specified by the part pointer portion T6.

This modification is made for the following reason. As the offset values and contour data are put together in the sixth embodiment, if there are different offsets for the same contour, those information cannot be shared by characters. Thus, the offset information is provided separate from the contour data in the seventh embodiment so that for the same contour, the contour data can be shared, thus considerably reducing the number of pieces of contour data.

Figure 29:
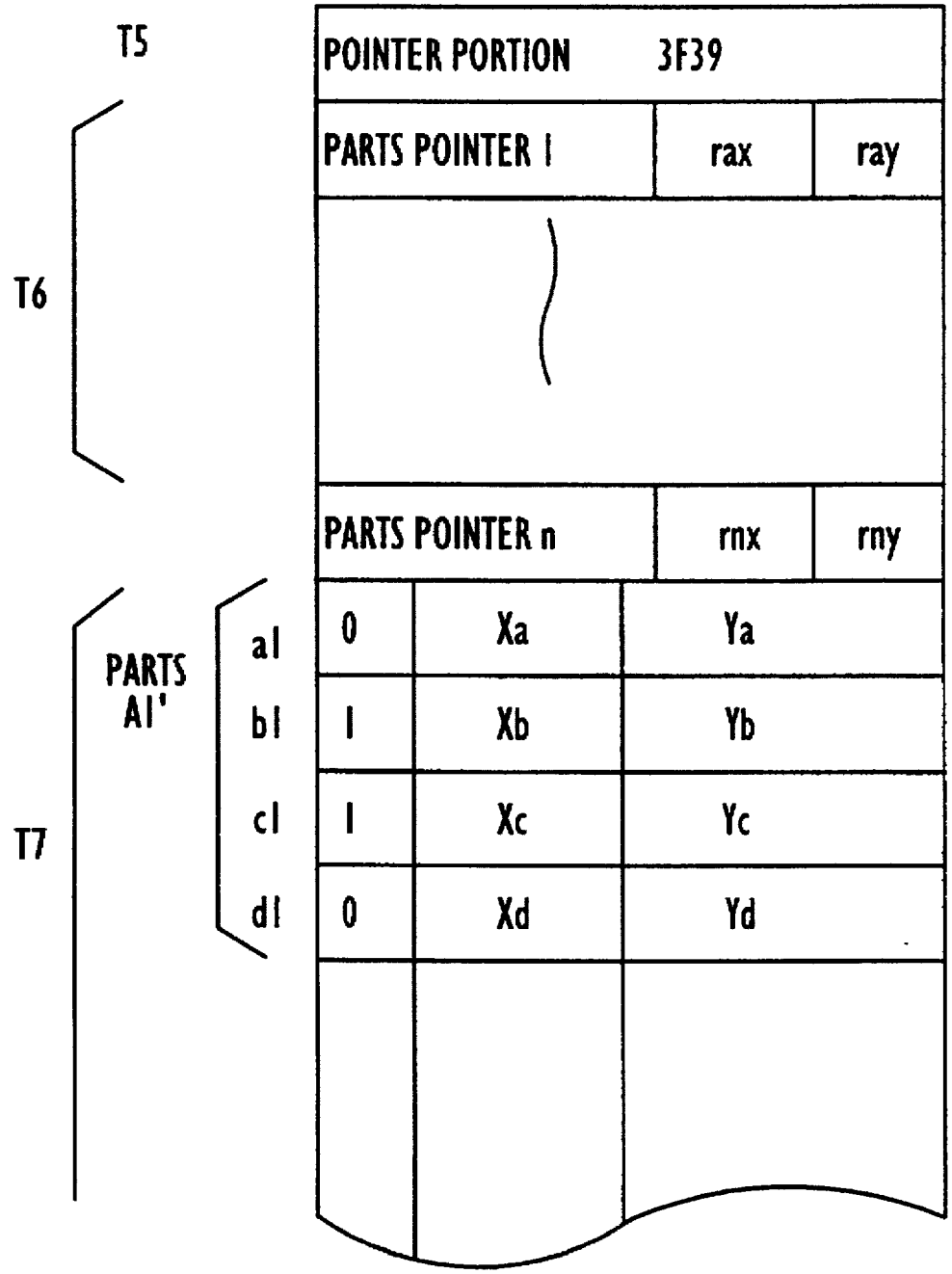
FIG. 29 illustrates the structure of an font file according to an eighth embodiment of the present invention.
Figure 30A:
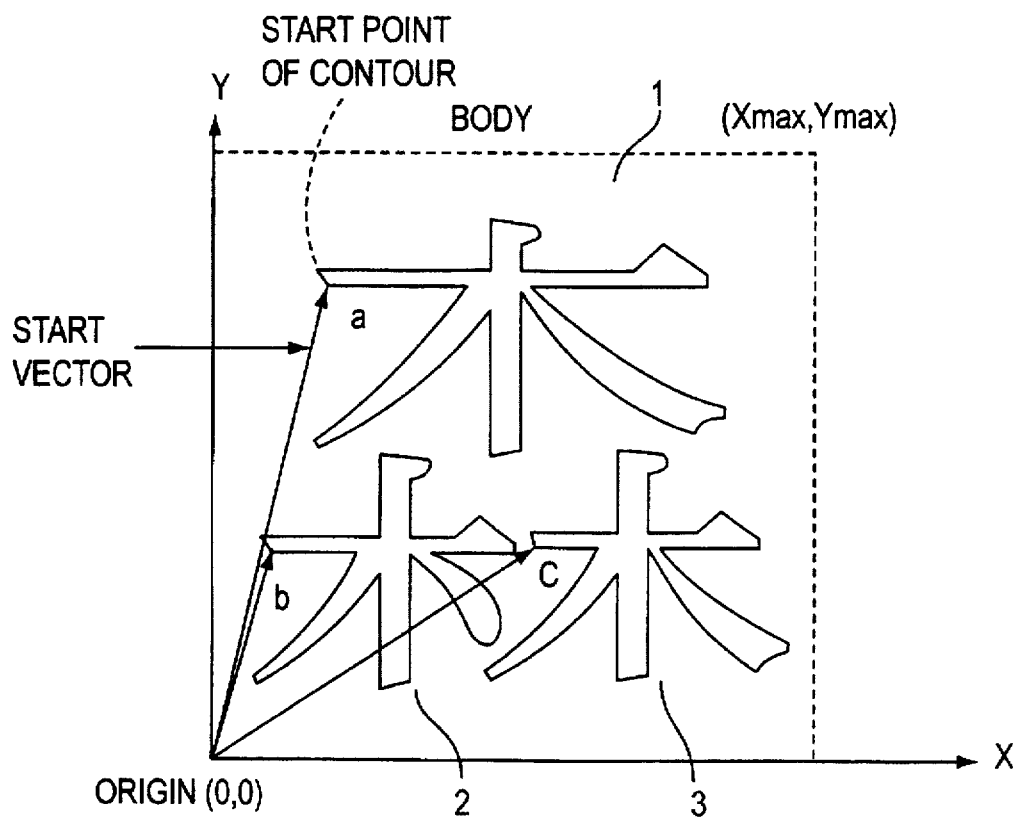
FIGS. 30(A and B) is an exemplary diagram for explaining a conventional way of dividing a character into partial patterns.
Figure 30B:
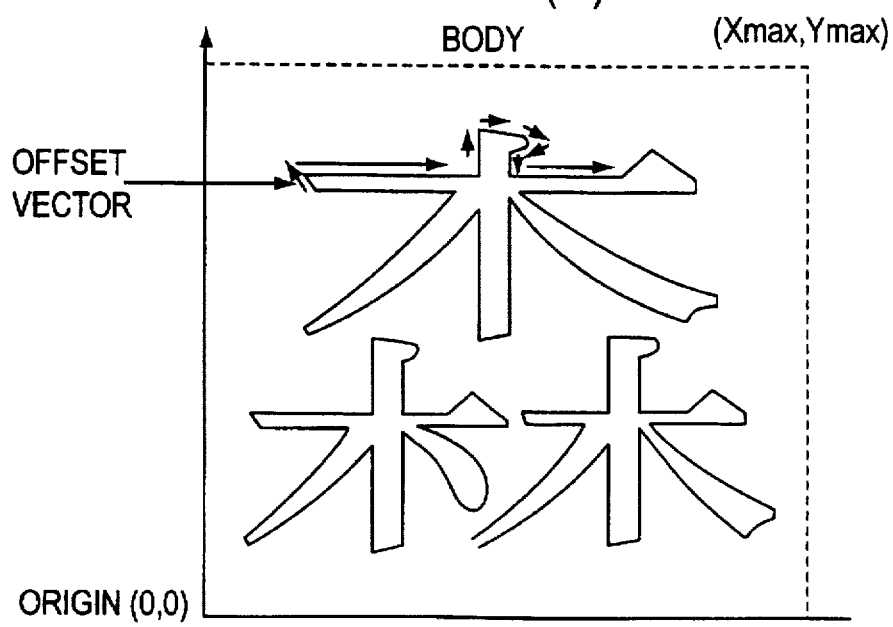
Figure 31:
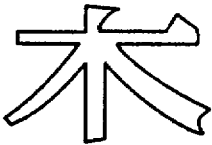
FIG. 31 is an exemplary diagram of character generating data in FIG. 30.
Figure 31:
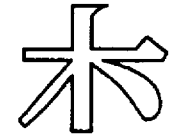
Figure 31:
Figure 32A:
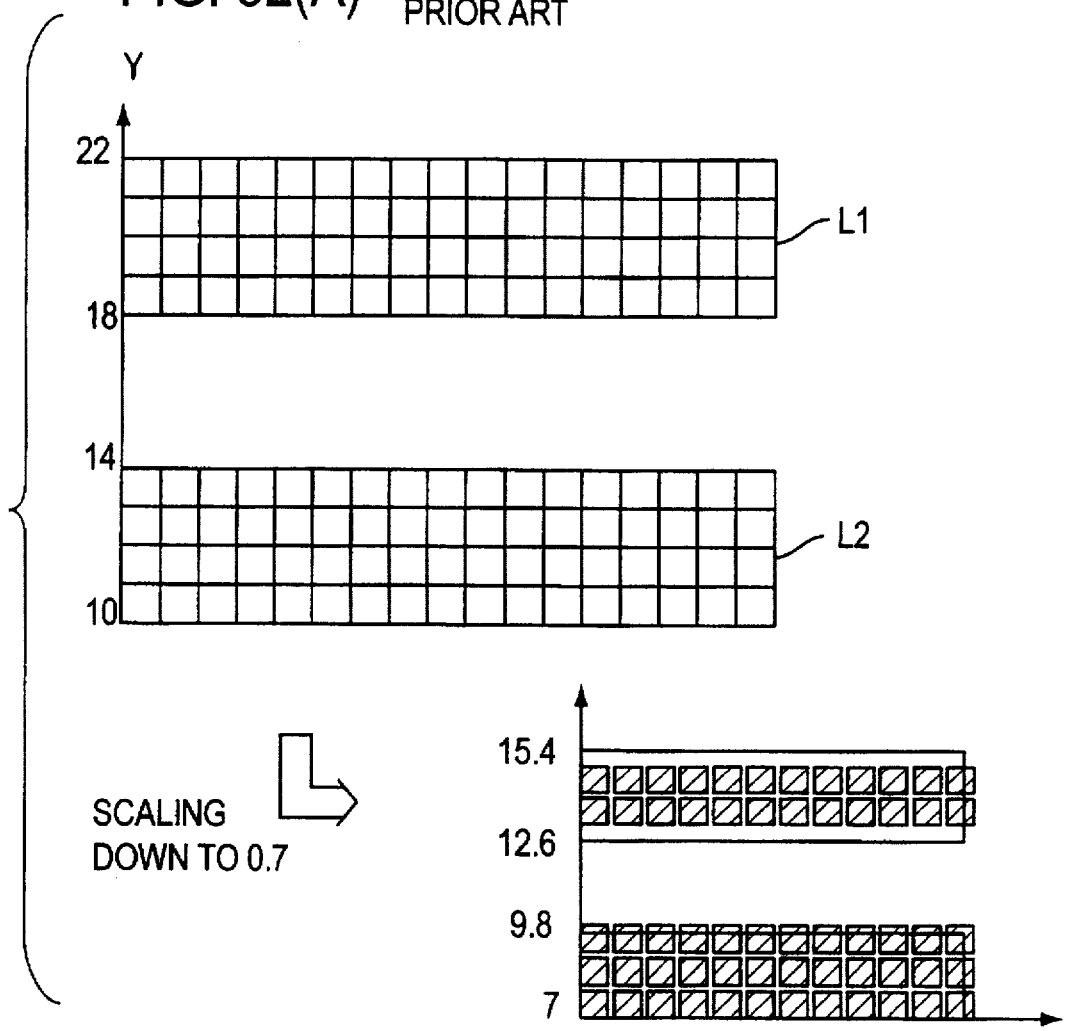
FIGS. 32(A and B) is an exemplary diagram of a scaling process.
Figure 32B:
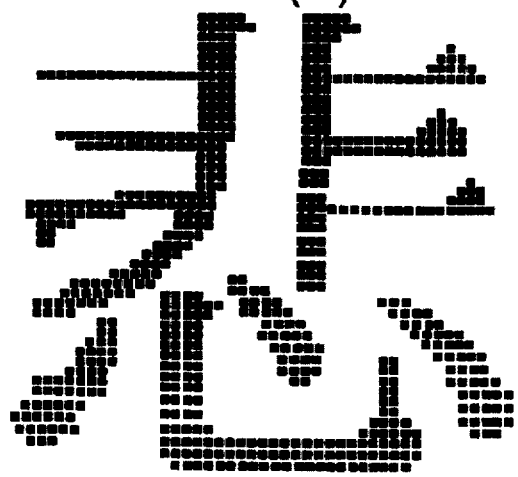
Figure 33:
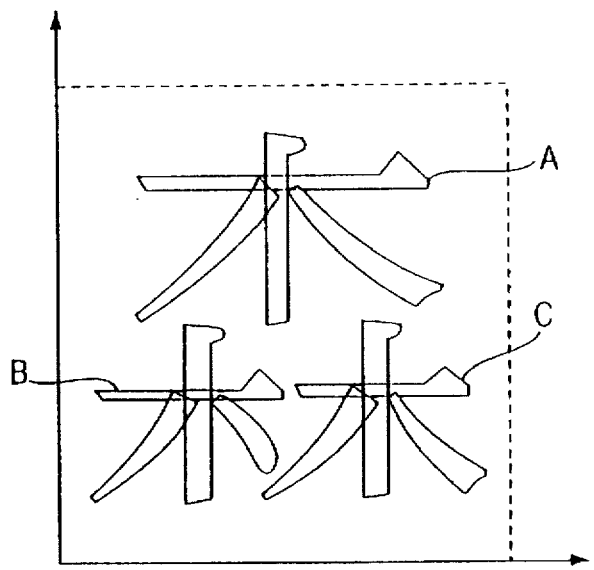
FIG. 33 is a diagram for explaining a deformation of a character stroke in a scaling process.
Figure 33:
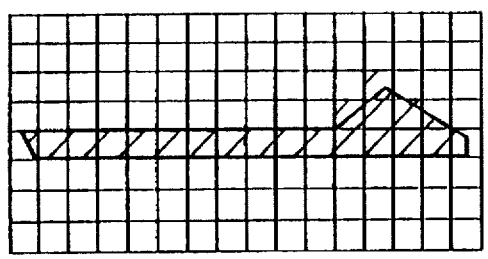
Figure 33:
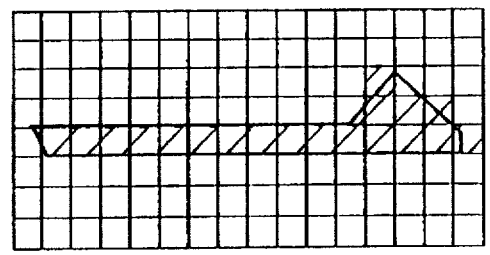
Figure 33:
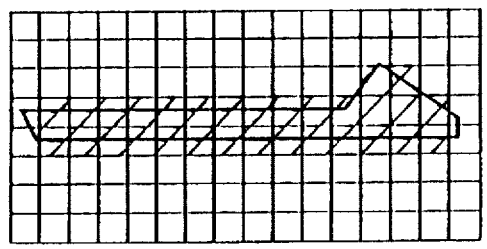
Figure 34A:
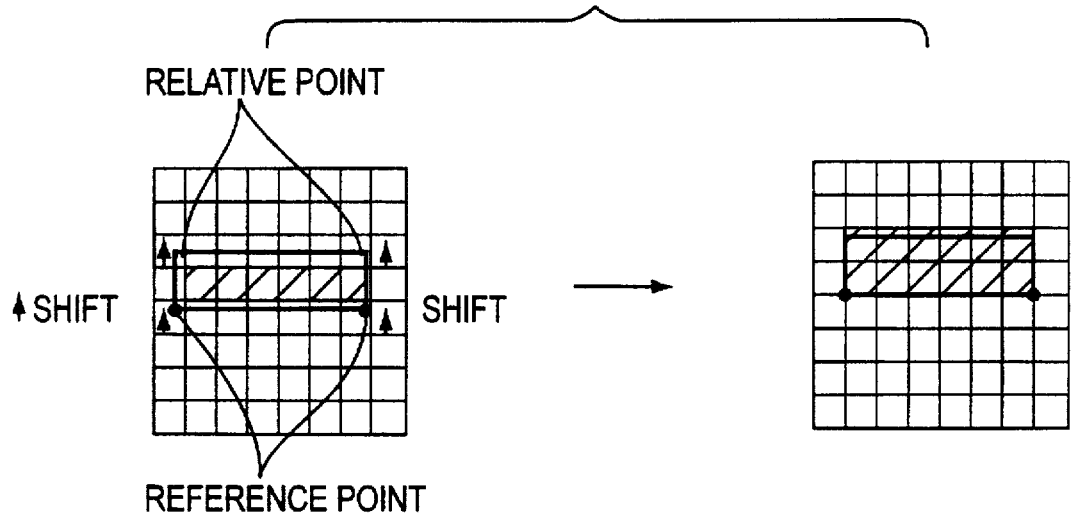
FIGS. 34(A,B and C) is an exemplary diagram of a conventional character hinting.
Figure 34B:
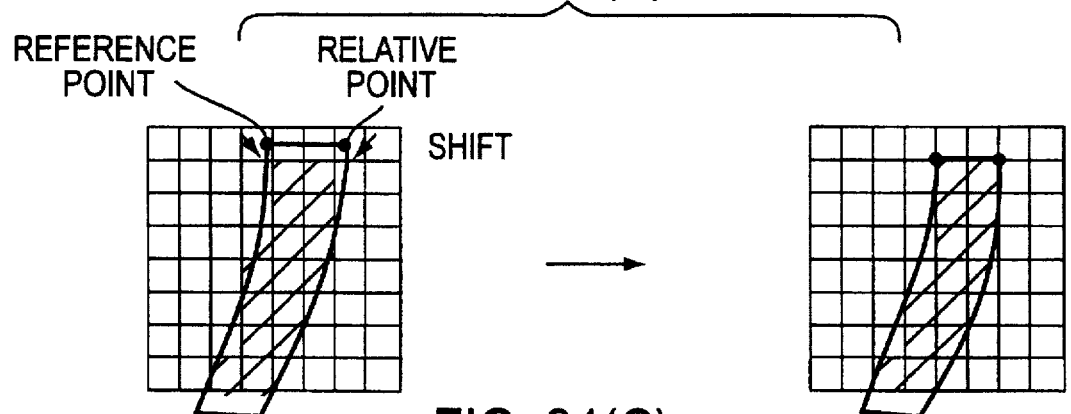
Figure 34C:
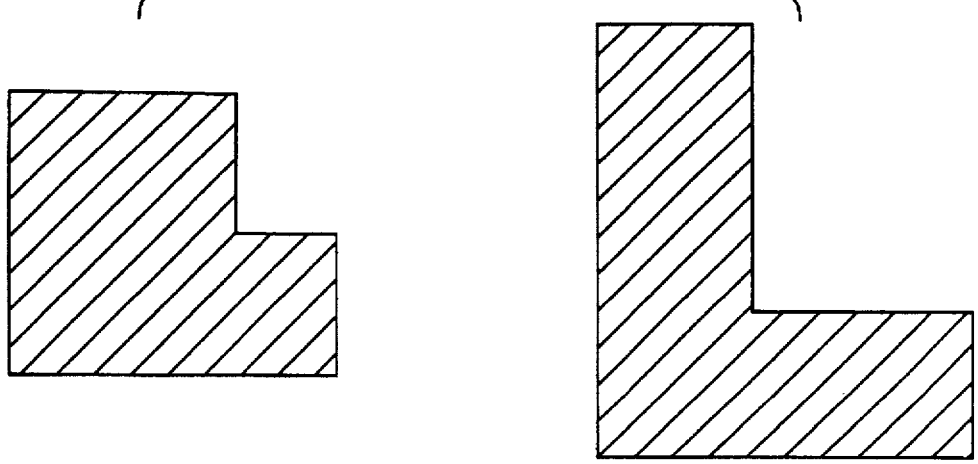

Further, the offset information portion may be provided in the part pointer portion T6 as shown in FIG. 29, which is an eighth embodiment of the present invention. That is, the part pointer portion T6 contain part pointers 1, 2, 3 and so forth, which point the respective locations of the contour information portion T7, and offset values (ax, ay), (bx, by) and so forth of the parts indicated by those part pointers.

This design eliminates the need for the offset information portion T71 in FIG. 28 and can thus reduce the required memory capacity.

Although the structure information is given stroke by stroke, it may be given for each part.

In short, according to this invention, the structure information of the individual strokes or parts of each character are previously stored in a memory, point data is multiplied by a scaling factor in response to scaling up or down of a character, the computed point data is subjected to quantization for compensation based on the structure information of the strokes or parts and the hint information, and the individual strokes or parts are formed based on the quantized point data. This prevents a stroke from being erroneously recognized through pattern recognition, ensuring accurate hinting.

As many apparently widely different embodiments of the present invention can be made without departing from the spirit and scope thereof, it is to be understood that the invention is not limited to the specific embodiments thereof except as defined in the appended claims.

What is claimed is:

1. A character generating method for selecting individual partial patterns constituting a desired character having a desired font in accordance with a given character code and a given font name from stored partial patterns, and arranging said selected partial patterns at respective start points to generate a character pattern representing said desired character having said desired font, said method comprising the steps of:

storing common start point data of individual partial patterns of a character, relative position data representing relative positions of said individual partial patterns and shape data representing shapes of said individual partial patterns of said character in a storage means, said common start point data representing an absolute start point and being set in common to each font representing the same character and being set in a coordinate system of 1/n size of a set coordinate system of said character pattern, n being a sizing factor, said desired character having said desired font relative to said common start points;

reading said common start point data of individual partial patterns of a character corresponding to said character code, said relative position data and said shape data representing shapes of said individual partial patterns by positions of a plurality of contour points, respectively, of said character in accordance with said character code and said font name from said storage means;

computing coordinate values of said respective start points of said individual partial patterns of said character from said common start point data by multiplying said common start point data set in said 1/n size coordinate system by n, and said relative position data of said individual partial patterns; and generating said character pattern having said desired font from computed coordinate values of said respective start points and said shape data.

2. The character generating method according to claim 1, wherein said partial patterns are elements each having a continuous shape in said character pattern.

3. The character generating method according to claim 1, wherein said partial patterns are strokes into which elements each having a continuous shape in said character pattern are broken down.

4. The character generating method according to claim 1, wherein said partial patterns are parts obtained by dividing strokes into which each element having a continuous shape in said character pattern is broken down.

5. The character generating method according to claim 1, wherein said shape data of said partial patterns are contour data; and said generating step computes coordinate values of said partial patterns from said coordinate values of said respective start points and said contour data.

6. A character generating apparatus for selecting individual partial patterns constituting a desired character having a desired font in accordance with a given character code and a given font name from stored partial patterns, and arranging said selected partial patterns at respective start points to generate a character pattern representing said desired character having said desired font, said apparatus comprising:

storage means having a common file for storing common start point data of said partial patterns, said common start point data representing an absolute start point and being set in common to each font representing same character and being set in a coordinate system of 1/n size of a set coordinate system of said character pattern, n being a sizing factor, and an individual file for storing relative position data representing positions of said partial patterns of said character relative to common start points, and shape data of said partial patterns representing shapes of said partial patterns; and a character generating means for reading said common start point data of individual partial patterns of a character corresponding to said respective character code, said relative position data and said shape data of said individual partial patterns of said character by positions of a plurality of contour points in accordance with said character code and said font name from said storage means, computing coordinate values of said respective start points of said individual partial patterns of said character from said common start point data, by multiplying said common start point data set in said 1/n size coordinate system by n and said relative position data of said individual partial patterns, and generating said desired character pattern having said desired font from computed coordinate values of said respective start points and said shape data.

7. The character generating apparatus according to claim 6, wherein said partial patterns are elements each having a continuous shape in said character pattern.

8. The character generating apparatus according to claim 6, wherein said partial patterns are strokes into which elements each having a continuous shape in said character pattern are broken down.

9. The character generating apparatus according to claim 6, wherein said partial patterns are parts obtained by dividing strokes into which each element having a continuous shape in said character pattern is broken down.

10. The character generating apparatus according to claim 6, wherein said storage means stores said shape data of said partial patterns as contour data; and said character generating means generates coordinate values of said partial patterns from said coordinate values of said respective start points and said contour data.

11. A character generating method for selecting individual partial patterns constituting a character in accordance with a given character code from stored partial patterns, and arranging said selected partial patterns at respective start points to generate a character pattern corresponding to said character code, said method comprising the steps of:

reading from storage means in which contour data of strokes or parts constituting each character, structure information representing types of said strokes or parts and information about individual pieces of said contour data of said strokes or parts for indicating a reference point and a relative point thereof are stored as said partial patterns, said contour data and structure information of strokes or parts corresponding to a character code of said character and said information about individual pieces;

multiplying said contour data by a scaling factor in response to scaling up or down of a character;

determining said reference point and said relative point in accordance with said structure information of said strokes or parts and said information about individual pieces;

subjecting said multiplied contour data to quantization for a compensation of a position by shifting said relative point in respect to said reference point after said reference point has been shifted to nearest integer values; and forming said strokes or parts according to a quantized contour data to generate a scaled-up or scaled-down character pattern.

12. The character generating method according to claim 11, wherein said information about individual pieces includes reference contour information that designates a data point to be a reference point for said quantization for compensation, and relative point information that designates a data point to be rounded.

13. The character generating method according to claim 11, wherein said reading step reads out said structure information corresponding to a character code, said point data of said strokes or parts corresponding to said character code, and said information about individual pieces of said contour data from said storage means having a common file in which said structure information representing types of said strokes or parts is stored and a font file in which said contour data of said strokes or parts and said information about individual pieces of said point data are stored for each typeface.

14. The character generating method according to claim 11, wherein said reading step reads out said structure information corresponding to a character code, said contour data of said strokes or parts corresponding to said character code, and said information about individual pieces of said contour data from said storage means having a common file in which said structure information representing types of said strokes or parts is stored and a font file in which said contour data of said strokes or parts and said information about individual pieces of said contour data are stored for each typeface.

15. A character generating apparatus for selecting individual partial patterns constituting a character in accordance with a given character code from stored partial patterns, and arranging said selected partial patterns at respective start points to generate a character pattern corresponding to said character code, said apparatus comprising:

storage means in which contour data of strokes or parts of each character, structure information representing types of said strokes or parts and information about individual pieces of said contour data of said strokes or parts for indicating a reference point and a relative point thereof are stored as said partial patterns; and character generating means for reading said contour data and structure information of strokes or parts corresponding to a character code and said information about individual pieces, multiplying said contour data by a scaling factor in response to scaling up or down of a character, subjecting said multiplied contour data to quantization for a compensation of a position by shifting said relative point in respect to said reference point after said reference point has been shifted to nearest integer values, determining said reference point and said relative point in accordance with said structure information of said strokes or parts and said information about individual pieces, and forming said strokes or parts according to a quantized contour data to generate said scaled-up or scaled-down character pattern.

16. The character generating apparatus according to claim 15, wherein said storage means stores reference contour information that designates a data point to be a reference point for said quantization for compensation, and relative point information that designates a data point to be rounded, as said hint information.

17. The character generating apparatus according to claim 15, wherein said storage means stores said structure information representing types of said strokes or parts in a common file and stores said contour data of said strokes or parts and said information about individual pieces of said contour data for each typeface in a font file; and said character generating means reads out said structure information corresponding to a character code, said contour data of said strokes or parts corresponding to said character code, and said information about individual pieces of said contour data from said storage means.

18. The character generating apparatus according to claim 15, wherein said storage means stores said structure information representing types of said strokes or parts in a common file and stores said contour data of said strokes or parts and said information about individual pieces of said contour data for each typeface in a font file; and said character generating means reads out said structure information corresponding to a character code, said contour data of said strokes or parts corresponding to said character code, and said information of about individual pieces said contour data from said storage means.

\* \* \* \* \*

UNITED STATES PATENT AND TRADEMARK OFFICE
CERTIFICATE OF CORRECTION

PATENT NO. : 5,727,140
DATED : MARCH 10, 1998
INVENTOR(S) : Mutsumi OHTOMO, et al.

It is certified that error appears in the above-indentified patent and that said Letters Patent is hereby corrected as shown below:

On the title page, item (73), please insert --Ohtomo Laboratory Limited, Sapporo, Japan--, after Fujitsu Limited, Kanagawa, Japan.

Signed and Sealed this

Third Day of August, 1999

Q. TODD DICKINSON

*Attest:*

*Attesting Officer*   Acting Commissioner of Patents and Trademarks